US012781080B2

(12) United States Patent
Mizoe et al.

(10) Patent No.: US 12,781,080 B2
(45) **Date of Patent: *Nov. 3, 2026**

(54) INK SET AND IMAGE RECORDING METHOD

(71) Applicant: FUJIFILM Corporation, Tokyo (JP)

(72) Inventors: Taiga Mizoe, Kanagawa (JP); Masao Ikoshi, Kanagawa (JP); Ryuji Shinohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 605 days.

This patent is subject to a terminal disclaimer.

(21) Appl. No.: 18/364,208

(22) Filed: Aug. 2, 2023

(65) Prior Publication Data

US 2023/0374327 A1 Nov. 23, 2023

Related U.S. Application Data

(63) Continuation of application No. PCT/JP2022/003219, filed on Jan. 28, 2022.

(30) Foreign Application Priority Data

Feb. 4, 2021 (JP) ................................ 2021-016766

(51) Int. Cl.

*C09D 11/40* (2014.01)
*B41J 2/21* (2006.01)
*C09D 11/037* (2014.01)
*C09D 11/107* (2014.01)
*C09D 11/322* (2014.01)
*C09D 11/54* (2014.01)

(52) U.S. Cl.

CPC ............. *C09D 11/40* (2013.01); *B41J 2/2114* (2013.01); *B41J 2/2117* (2013.01); *C09D 11/037* (2013.01); *C09D 11/107* (2013.01); *C09D 11/322* (2013.01); *C09D 11/54* (2013.01)

(58) Field of Classification Search

CPC ....... C09D 11/40; C09D 11/322; C09D 11/54; C09D 11/037; C09D 11/107
USPC ........................................................ 524/413
See application file for complete search history.

(56) References Cited

U.S. PATENT DOCUMENTS

| | | | |
|---|---|---|---|
| 2007/0259986 | A1 | 11/2007 | Elwakil et al. |
| 2014/0287206 | A1 | 9/2014 | Sasada et al. |
| 2015/0054883 | A1 | 2/2015 | Okuda et al. |
| 2018/0030301 | A1 | 2/2018 | Yamazaki et al. |
| 2018/0223119 | A1 | 8/2018 | Oriakhi et al. |
| 2018/0244943 | A1 | 8/2018 | Okuda et al. |
| 2020/0087527 | A1 | 3/2020 | Okuda |
| 2020/0131391 | A1 | 4/2020 | Okuda et al. |
| 2020/0332137 | A1 | 10/2020 | Kawata et al. |
| 2021/0002502 | A1 | 1/2021 | Kawai et al. |
| 2021/0009834 | A1 | 1/2021 | Kawai et al. |
| 2021/0222023 | A1 | 7/2021 | Okuda et al. |
| 2022/0002570 | A1 | 1/2022 | Kawai et al. |
| 2023/0095049 | A1 | 3/2023 | Okuda et al. |

FOREIGN PATENT DOCUMENTS

| | | | | |
|---|---|---|---|---|
| JP | 2006-273894 A | | 10/2006 | |
| JP | 2010-150326 A | | 7/2010 | |
| JP | 2014-185235 A | | 10/2014 | |
| JP | 2017-031354 A | | 2/2017 | |
| JP | 2017-214461 A | | 12/2017 | |
| JP | 2018-009260 A | | 1/2018 | |
| JP | 2018-024853 A | | 2/2018 | |
| JP | 2018-528876 A | | 10/2018 | |
| JP | 2018-178131 A | | 11/2018 | |
| JP | 2019-112601 A | | 7/2019 | |
| JP | 2019-116598 A | | 7/2019 | |
| JP | 2019-167493 A | | 10/2019 | |
| JP | 2020-044724 A | | 3/2020 | |
| WO | WO-2019131215 A1 | * | 7/2019 | ............ B41J 2/2107 |
| WO | 2019/187665 A1 | | 10/2019 | |
| WO | 2019/188855 A1 | | 10/2019 | |
| WO | 2019/188856 A1 | | 10/2019 | |
| WO | 2020/066468 A1 | | 4/2020 | |
| WO | 2020/174940 A1 | | 9/2020 | |
| WO | 2020/195211 A1 | | 10/2020 | |

OTHER PUBLICATIONS

European Patent Office Action dated Aug. 6, 2025, issued in European application No. 22749612.2.
Office Action issued May 13, 2025 in Japanese Application No. 2022-579502.
Extended European Search Reported dated Aug. 2, 2024 in Application No. 22749612.2.
Yoshida, et al., "Synthesis of a Random Block Copolymer Comprising Poly(styrene-ran-p-methoxystyrene) and Poly(styrene-ran-p-t-butoxystyrene) by 2,2,6,6-Tetramethylpiperidine-1-oxyl-mediated Living Radical Polymerization", Polymer Journal, May 15, 1999, vol. 31, No. 5, pp. 429-434 (6 pages).
International Search Report issued Apr. 19, 2022 in Application No. PCT/JP2022/003219.
Written Opinion of the International Searching Authority issued Apr. 19, 2022 in Application No. PCT/JP2022/003219.
International Preliminary Report on Patentability issued Aug. 3, 2023 in Application No. PCT/JP2022/003219.
Communication dated Apr. 30, 2024, issued in Chinese Application No. 202280012996.0.

* cited by examiner

*Primary Examiner* — Deve V Hall
(74) *Attorney, Agent, or Firm* — Sughrue Mion, PLLC

(57) ABSTRACT

Provided are an ink set and an image recording method which enable an image recorded material with excellent adhesiveness and excellent bend resistance to be obtained in a case where an image is recorded using a colored ink and a white ink.

The ink set is an ink set including a colored ink which contains at least one colored pigment selected from the group consisting of a chromatic pigment and a black pigment, a first pigment dispersant, and water, and a white ink which contains a white pigment, a second pigment dispersant, and water, in which the first pigment dispersant is a random polymer, and the second pigment dispersant is a block polymer.

17 Claims, No Drawings

INK SET AND IMAGE RECORDING METHOD

CROSS-REFERENCE TO RELATED APPLICATIONS

This application is a continuation application of International Application No. PCT/JP2022/003219, filed Jan. 28, 2022, the disclosure of which is incorporated herein by reference in its entirety. Further, this application claims priority from Japanese Patent Application No. 2021-016766, filed Feb. 4, 2021, the disclosure of which is incorporated herein by reference in its entirety.

BACKGROUND OF THE INVENTION

1. Field of the Invention

The present disclosure relates to an ink set and an image recording method.

2. Description of the Related Art

In the related art, various examinations have been conducted on image recording carried out using a plurality of inks.

For example, JP2018-178131A describes an ink set including a reaction solution containing an aggregating agent, a first ink containing a coloring material, and a second ink containing a coloring material, in which the ink set is used for recording an image on a non-absorptive recording medium or a low-absorptive recording medium, and the ink set is used by applying the reaction solution, the first ink, and the second ink to the recording medium such that the reaction solution, the first ink, and the second ink are superimposed thereon in this order.

SUMMARY OF THE INVENTION

In a case where an image is recorded using a colored ink and a white ink, an image recorded material to be obtained is required to have adhesiveness and bend resistance.

The present disclosure has been made in view of the above-described circumstances, and an object to be achieved by an embodiment of the present disclosure is to provide an ink set and an image recording method which enable an image recorded material with excellent adhesiveness and excellent bend resistance to be obtained in a case where an image is recorded using a colored ink and a white ink.

The present disclosure includes the following aspects.

<1> An ink set comprising: a colored ink which comprises at least one colored pigment selected from the group consisting of a chromatic pigment and a black pigment, a first pigment dispersant, and water; and a white ink which comprises a white pigment, a second pigment dispersant, and water, in which the first pigment dispersant comprises a random polymer, and the second pigment dispersant comprises a block polymer.

<2> The ink set according to <1>, in which in a case where a glass transition temperature of the first pigment dispersant is defined as Tgc, and n number of glass transition temperatures of the second pigment dispersant are respectively defined as Tg1 to Tgn, a maximum value among absolute values of differences between Tgc and Tg1 to Tgn is 50° C. or higher.

<3> The ink set according to <1> or <2>, in which in a case where a glass transition temperature of the first pigment dispersant is defined as Tgc, and n number of glass transition temperatures of the second pigment dispersant are respectively defined as Tg1 to Tgn, a minimum value among absolute values of differences between Tgc and Tg1 to Tgn is 5° C. or higher.

<4> The ink set according to <2> or <3>, in which Tgc represents a value less than any of Tg1 to Tgn.

<5> The ink set according to any one of <2> to <4>, in which Tgc is 150° C. or lower, and a highest temperature among Tg1 to Tgn is 200° C. or lower.

<6> The ink set according to any one of <1> to <5>, in which each of the first pigment dispersant and the second pigment dispersant comprises a polymer comprising a structural unit derived from a monomer that comprises a hydrocarbon group having 4 or more carbon atoms, in a content of 30% by mass or greater with respect to a total amount of the polymer.

<7> The ink set according to any one of <1> to <6>, in which the second pigment dispersant comprises a polymer having a structural unit derived from a monomer that comprises an alicyclic hydrocarbon group having 6 or more carbon atoms.

<8> The ink set according to any one of <1> to <7>, in which an absolute value of a difference in number average molecular weight between the first pigment dispersant and the second pigment dispersant is 10,000 or greater.

<9> The ink set according to any one of <1> to <8>, in which a number average molecular weight of the first pigment dispersant is greater than a number average molecular weight of the second pigment dispersant.

<10> The ink set according to any one of <1> to <9>, further comprising: a pretreatment liquid comprising an aggregating agent.

<11> An image recording method, comprising: applying the colored ink in the ink set according to any one of <1> to <10> onto an impermeable base material using an ink jet recording method; and applying the white ink in the ink set according to any one of <1> to <10> using an ink jet recording method onto a colored ink film formed by the application of the colored ink.

According to the present disclosure, it is possible to provide an ink set and an image recording method which enable an image recorded material with excellent adhesiveness and excellent bend resistance to be obtained in a case where an image is recorded using a colored ink and a white ink.

DESCRIPTION OF THE PREFERRED EMBODIMENTS

Hereinafter, an ink set and an image recording method of the present disclosure will be described in detail.

In the present specification, a numerical range shown using "to" indicates a range including the numerical values described before and after "to" as a minimum value and a maximum value, respectively.

In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

In the present disclosure, in a case where a plurality of substances corresponding to respective components in a composition are present, the amount of the respective components in the composition indicates the total amount of the plurality of substances present in the composition unless otherwise specified.

In the present invention, a combination of two or more preferred embodiments is a more preferred embodiment.

In the present disclosure, the meaning of the term "step" includes not only an independent step but also a step whose intended purpose is achieved even in a case where the step is not clearly distinguished from other steps.

In the present specification, the term "image" denotes an entire film formed by applying an ink, and the term "image recording" denotes formation of an image (that is, the film).

Further, the concept of "image" in the present specification also includes a solid image.

In the present specification, the concept of "(meth)acrylate" includes both acrylate and methacrylate. In addition, the concept of "(meth)acryl" includes both acryl and methacryl.

[Ink Set]

An ink set according to the present disclosure is an ink set including a colored ink which contains at least one colored pigment selected from the group consisting of a chromatic pigment and a black pigment, a first pigment dispersant, and water, and a white ink which contains a white pigment, a second pigment dispersant, and water, in which the first pigment dispersant is a random polymer, and the second pigment dispersant is a block polymer.

For example, JP2018-178131A describes an ink set used by applying a reaction solution, a first ink, and a second ink to a recording medium such that the reaction solution, the first ink, and the second ink are superimposed thereon in this order. However, JP2018-178131A does not pay attention to the structure of a resin dispersant that disperses a pigment.

Meanwhile, in the ink set of the present disclosure, the first pigment dispersant contained in the colored ink is a random polymer, and the second pigment dispersant contained in the white ink is a block polymer. Since the first pigment dispersant contained in the colored ink and the second pigment dispersant contained in the white ink have different polymer forms, the surface and the inside of an ink film are presumed to have different film formation degrees in a case of formation of the ink film. In this manner, it is considered that the breaking elongation rate of the ink film is high and the bend resistance of an image recorded material to be obtained is excellent. Further, it is presumed that since the pigment dispersant contained in the colored ink is a random polymer, the pigment dispersant is aligned at the interface between the colored ink film and the white ink film. In this manner, it is considered that the interaction between the colored ink film and the white ink film is strong, and the adhesiveness of an image recorded material to be obtained is excellent.

Hereinafter, each component contained in the colored ink and the white ink constituting the ink set of the present disclosure will be described.

<Colored Ink>

In the present disclosure, the colored ink contains at least one colored pigment selected from the group consisting of a chromatic pigment and a black pigment, a pigment dispersant, and water.

(Colored Pigment)

The colored ink contains at least one colored pigment selected from the group consisting of a chromatic pigment and a black pigment. The colored ink may contain only one or two or more kinds of colored pigments. That is, the colored pigment contained in the colored ink may be one or more kinds of chromatic pigments, one or more kinds of black pigments, or a combination of one or more kinds of chromatic pigments and one or more kinds of black pigments.

The chromatic pigment may be a pigment exhibiting a chromatic color, and the kind thereof is not particularly limited. The chromatic color denotes a color with a tint.

The chromatic pigment is not particularly limited, and examples thereof include a cyan pigment, a magenta pigment, a yellow pigment, a blue pigment, a red pigment, a green pigment, an orange pigment, and a violet pigment.

Specific examples of the chromatic pigment include organic pigments such as an azo pigment, a disazo pigment, a condensed disazo pigment, a phthalocyanine pigment, a quinacridone pigment, a quinacridone quinone pigment, an anthraquinone pigment, an aminoanthraquinone pigment, an anthanthrone pigment, a dioxazine pigment, an indigo pigment, a thioindigo pigment, a perinone pigment, a perylene pigment, an isoindoline pigment, an isoindolinone pigment, an isoviolanthrone pigment, a benzimidazolone pigment, an indanthrone pigment, a triarylcarbonium pigment, and a diketopyrrolopyrrole pigment.

More specific examples of the chromatic pigment include a perylene pigment such as C.I. Pigment Red 190, C.I. Pigment Red 224, or C.I. Pigment Violet 29; a perinone pigment such as C.I. Pigment Orange 43 or C.I. Pigment Red 194; a quinacridone pigment such as C.I. Pigment Violet 19, C.I. Pigment Violet 42, C.I. Pigment Red 122, C.I. Pigment Red 192, C.I. Pigment Red 202, C.I. Pigment Red 207, or C.I. Pigment Red 209; a quinacridone quinone pigment such as C.I. Pigment Red 206, C.I. Pigment Orange 48, or C.I. Pigment Orange 49; an anthraquinone pigment such as C.I. Pigment Yellow 147; an anthanthrone pigment such as C.I. Pigment Red 168; a benzimidazolone pigment such as C.I. Pigment Brown 25, C.I. Pigment Violet 32, C.I. Pigment Orange 36, C.I. Pigment Yellow 120, C.I. Pigment Yellow 180, C.I. Pigment Yellow 181, C.I. Pigment Orange 62, or C.I. Pigment Red 185; a condensed disazo pigment such as C.I. Pigment Yellow 93, C.I. Pigment Yellow 94, C.I. Pigment Yellow 95, C.I. Pigment Yellow 128, C.I. Pigment Yellow 166, C.I. Pigment Orange 34, C.I. Pigment Orange 13, C.I. Pigment Orange 31, C.I. Pigment Red 144, C.I. Pigment Red 166, C.I. Pigment Red 220, C.I. Pigment Red 221, C.I. Pigment Red 242, Pigment Red 248, C.I. Pigment Red 262, or C.I. Pigment Brown 23; a disazo pigment such as C.I. Pigment Yellow 13, C.I. Pigment Yellow 83, or C.I. Pigment Yellow 188; an azo pigment such as C.I. Pigment Red 187, C.I. Pigment Red 170, C.I. Pigment Yellow 74, C.I. Pigment Yellow 150, C.I. Pigment Red 48, C.I. Pigment Red 53, C.I. Pigment Orange 64, or C.I. Pigment Red 247; an indanthrone pigment such as C.I. Pigment Blue 60; a phthalocyanine pigment such as C.I. Pigment Green 7, C.I. Pigment Green 36, C.I. Pigment Green 37, C.I. Pigment Green 58, C.I. Pigment Blue 16, C.I. Pigment Blue 75, or C.I. Pigment Blue 15; a triarylcarbonium pigment such as C.I. Pigment Blue 56 or C.I. Pigment Blue 61; a dioxazine pigment such as C.I. Pigment Violet 23 or C.I. Pigment Violet 37; an aminoanthraquinone pigment such as C.I. Pigment Red 177; a diketopyrrolopyrrole pigment such as C.I. Pigment Red 254, C.I. Pigment Red 255, C.I. Pigment Red 264, C.I. Pigment Red 272, C.I. Pigment Orange 71, or C.I. Pigment Orange 73; a thioindigo pigment such as C.I. Pigment Red 88; an isoindoline pigment such as C.I. Pigment Yellow 139 or Pigment Orange 66; an isoindolinone pigment such as Pigment Yellow 109 or C.I. Pigment Orange 61; a pyranthrone pigment such as C.I. Pigment Orange 40 or C.I. Pigment Red 216; and an isoviolanthrone pigment such as C.I. Pigment Violet 31.

The black pigment may be a pigment exhibiting a black color, and the kind thereof is not particularly limited. Examples of the black pigment include carbon black and titanium black.

The average particle diameter of the chromatic pigment and the black pigment is preferably in a range of 10 nm to 200 nm, more preferably in a range of 10 nm to 150 nm, and still more preferably in a range of 10 nm to 110 nm. The color reproducibility is enhanced in a case where the average particle diameter is 200 nm or less, and the jetting stability is enhanced in a case where an image is recorded using an ink jet recording method. Further, the light resistance is enhanced in a case where the average particle diameter is 10 nm or greater. In addition, the particle size distribution of the pigment may be any of a wide particle size distribution or a monodispersed particle size distribution. Further, the average particle diameter and the particle size distribution of the pigment are acquired by measuring the volume average particle diameter using a particle size distribution measuring device, for example, "NANOTRAC UPA-EX150" (product name, manufactured by Nikkiso Co., Ltd.) according to a dynamic light scattering method. Further, in a case where the pigment is coated with the pigment dispersant, the average particle diameter of the pigment denotes the average particle diameter of the pigment coated with the pigment dispersant.

From the viewpoints of the image density and the jetting stability, the content of the colored pigment is preferably in a range of 1% by mass to 15% by mass and more preferably in a range of 2% by mass to 10% by mass with respect to the total mass of the colored ink.

(First Pigment Dispersant)

The colored ink of the present disclosure contains a first pigment dispersant. The first pigment dispersant is a random polymer. In the present disclosure, the polymer denotes a compound having a number average molecular weight of 1,000 or greater.

In the present disclosure, the number average molecular weight and the weight-average molecular weight denote values measured by gel permeation chromatography (GPC). The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

The random polymer is also referred to as a random copolymer and denotes a polymer which has structural units derived from at least two kinds of monomers and in which the order of the structural units is random.

In the present disclosure, the pigment dispersant has a function of dispersing the pigment. The pigment dispersant is adsorbed on the surface of the pigment and applied to at least a part of the surface of the pigment, and thus the pigment can be dispersed in water.

It is preferable that the random polymer serving as the first pigment dispersant has a structural unit derived from a hydrophobic monomer and a structural unit derived from a monomer containing an anionic group (hereinafter, referred to as "anionic group-containing monomer"). From the viewpoint of dispersion stability, the content ratio (a:b) of a structural unit a derived from a hydrophobic monomer to a structural unit b derived from an anionic group-containing monomer is preferably in a range of 8:1 to 1:1.

The structural unit derived from a hydrophobic monomer contained in the random polymer may be used alone or two or more kinds thereof.

The structural unit derived from an anionic group-containing monomer contained in the random polymer may be used alone or two or more kinds thereof.

As the hydrophobic monomer, a monomer containing a hydrocarbon group having 4 or more carbon atoms is preferable, an ethylene unsaturated monomer containing a hydrocarbon group having 4 or more carbon atoms is more preferable, and a (meth)acrylate containing a hydrocarbon group having 4 or more carbon atoms is still more preferable. The hydrocarbon group may be any of a chain-like hydrocarbon group, an alicyclic hydrocarbon group, or an aromatic hydrocarbon group. The number of carbon atoms of the hydrocarbon group is more preferably 4 or more and still more preferably 6 or more. The upper limit of the number of carbon atoms of the hydrocarbon group is, for example, 12.

Examples of the (meth)acrylate containing a chain-like hydrocarbon group having 4 or more carbon atoms include n-butyl (meth)acrylate, 2-ethylhexyl (meth)acrylate, octyl (meth)acrylate, and lauryl (meth)acrylate. The number of carbon atoms in the chain-like hydrocarbon group is more preferably 6 or more and still more preferably 8 or more. Among these, it is preferable that the ethylene unsaturated monomer containing a chain-like hydrocarbon group having 4 or more carbon atoms is lauryl (meth)acrylate.

Examples of the (meth)acrylate containing an alicyclic hydrocarbon group having 4 or more carbon atoms include (bicyclo[2.2.1]heptyl-2) (meth)acrylate, 1-adamantyl (meth) acrylate, 2-adamantyl (meth)acrylate, 3-methyl-1-adamantyl (meth)acrylate, 3,5-dimethyl-1-adamantyl (meth)acrylate, 3-ethyladamantyl (meth)acrylate, 3-methyl-5-ethyl-1-adamantyl (meth)acrylate, 3,5,8-triethyl-1-adamantyl (meth)acrylate, 3,5-dimethyl-8-ethyl-1-adamantyl (meth) acrylate, 2-methyl-2-adamantyl (meth)acrylate, 2-ethyl-2-adamantyl (meth)acrylate, 3-hydroxy-1-adamantyl (meth) acrylate, octahydro-4,7-methanoinden-5-yl (meth)acrylate, octahydro-4,7-methanoinden-1-ylmethyl (meth)acrylate, 1-methyl (meth)acrylate, tricyclodecane (meth)acrylate, 3-hydroxy-2,6,6-trimethyl-bicyclo[3.1.1]heptyl (meth)acrylate, 3,7,7-trimethyl-4-hydroxy-bicyclo[4.1.0]heptyl (meth) acrylate, (nor)bornyl (meth)acrylate, isobornyl (meth)acrylate, 2,2,5-trimethylcyclohexyl (meth)acrylate, and cyclohexyl (meth)acrylate. The number of carbon atoms of the alicyclic hydrocarbon group is more preferably 6 or more. Among these, it is preferable that the ethylene unsaturated monomer containing an alicyclic hydrocarbon group having 4 or more carbon atoms is isobornyl (meth)acrylate or cyclohexyl (meth)acrylate.

Examples of the (meth)acrylate containing an aromatic hydrocarbon group having 4 or more carbon atoms include styrene, 2-naphthyl (meth)acrylate, phenoxyethyl (meth) acrylate, and benzyl (meth)acrylate. Among these, it is preferable that the ethylene unsaturated monomer containing an aromatic hydrocarbon group having 4 or more carbon atoms is styrene.

Examples of the anionic group in the anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group.

Examples of the carboxy group-containing monomer include (meth)acrylic acid, β-carboxyethyl acrylate, fumaric acid, itaconic acid, maleic acid, and crotonic acid.

From the viewpoints of the dispersion stability, (meth) acrylic acid or β-carboxyethyl acrylate is preferable, and (meth)acrylic acid is more preferable as the anionic group-containing monomer.

The mixing ratio between the colored pigment and the first pigment dispersant is preferably in a range of 1:0.06 to 1:3, more preferably in a range of 1:0.125 to 1:2, and still more preferably in a range of 1:0.125 to 1:1.5 in terms of the mass.

As a dispersion apparatus for dispersing the pigment, a known dispersion apparatus can be used, and examples thereof include a ball mill, a sand mill, a beads mill, a roll mill, a jet mill, a paint shaker, an attritor, an ultrasonic disperser, and a disper.

(Water)

In the present disclosure, the colored ink contains water. The content of water is not particularly limited and is, for example, in a range of 40% by mass to 70% by mass.

(Resin Particles)

In the present disclosure, from the viewpoint of obtaining the rub resistance of the image, it is preferable that the colored ink contains at least one kind of resin particles. It is preferable that the colored ink contains resin particles which are particles formed of a resin, in addition to the pigment dispersant.

In particular, in a case where the colored ink contains resin particles, the image quality of an image is improved in a case where the pretreatment liquid is applied onto the base material in advance. In a case where the colored ink is applied onto the base material onto which the pretreatment liquid has been applied, the aggregating agent contained in the pretreatment liquid comes into contact with the resin particles contained in the colored ink and destabilizes the dispersion of the resin particles, and thus the viscosity of the colored ink is increased. In this manner, the colored ink is fixed on the base material, and the image quality of an image to be recorded is improved.

It is preferable that the resin constituting the resin particles is a water-insoluble polymer. The term "water-insoluble" in the water-insoluble polymer denotes a property that the amount of the polymer to be dissolved in 100 g of distilled water at 25° C. is less than 2 g.

The resin particles include preferably at least one of particles consisting of an acrylic resin (hereinafter, referred to as "acrylic resin particles") or particles consisting of a urethane resin (hereinafter, also referred to as "urethane resin particles") and more preferably acrylic resin particles.

It is preferable that the resin particles are self-dispersing resin particles.

Examples of the self-dispersing resin particles include resin particles described in paragraphs 0062 to 0076 of JP2016-188345A and paragraphs 0109 to 0140 of WO2013/180074A.

It is preferable that the resin in the resin particles is an acrylic resin having a structural unit derived from a (meth) acrylate having an aromatic ring structure or an alicyclic structure, a structural unit derived from (meth)acrylic acid, and a structural unit derived from alkyl (meth)acrylate containing an alkyl group having 1 to 4 carbon atoms.

As the (meth)acrylate having an alicyclic structure, alkyl (meth)acrylate containing a cycloalkyl group having 3 to 10 carbon atoms is preferable, at least one selected from the group consisting of cyclohexyl (meth)acrylate, isobornyl (meth)acrylate, adamantyl (meth)acrylate, and dicyclopentanyl (meth)acrylate is more preferable, and at least one selected from the group consisting of isobornyl (meth) acrylate, adamantyl (meth)acrylate, and dicyclopentanyl (meth)acrylate is still more preferable.

It is preferable that the (meth)acrylate having an aromatic ring structure is phenoxyethyl (meth)acrylate or benzyl (meth)acrylate.

Examples of the resin in the resin particles include a phenoxyethyl acrylate/methyl methacrylate/acrylic acid copolymer (50/45/5), a phenoxyethyl acrylate/benzyl methacrylate/isobutyl methacrylate/methacrylic acid copolymer (30/35/29/6), a phenoxyethyl methacrylate/isobutyl methacrylate/methacrylic acid copolymer (50/44/6), a phenoxyethyl acrylate/methyl methacrylate/ethyl acrylate/acrylic acid copolymer (30/55/10/5), a benzyl methacrylate/isobutyl methacrylate/methacrylic acid copolymer (35/59/6), a styrene/phenoxyethyl acrylate/methyl methacrylate/acrylic acid copolymer (10/50/35/5), a benzyl acrylate/methyl methacrylate/acrylic acid copolymer (55/40/5), a phenoxyethyl methacrylate/benzyl acrylate/methacrylic acid copolymer (45/47/8), a styrene/phenoxyethyl acrylate/butyl methacrylate/acrylic acid copolymer (5/48/40/7), a benzyl methacrylate/isobutyl methacrylate/cyclohexyl methacrylate/methacrylic acid copolymer (35/30/30/5), a phenoxyethyl acrylate/methyl methacrylate/butyl acrylate/methacrylic acid copolymer (12/50/30/8), a benzyl acrylate/isobutyl methacrylate/acrylic acid copolymer (93/2/5), a methyl methacrylate/methoxyethyl acrylate/benzyl methacrylate/acrylic acid copolymer (44/15/35/6), a styrene/butyl acrylate/acrylic acid copolymer (62/35/3), a methyl methacrylate/phenoxyethyl acrylate/acrylic acid copolymer (45/51/4), a methyl methacrylate/isobornyl methacrylate/methacrylic acid copolymer (20/72/8), a methyl methacrylate/isobornyl methacrylate/methacrylic acid copolymer (40/52/8), a methyl methacrylate/isobornyl methacrylate/methacrylic acid copolymer (48/42/10), a methyl methacrylate/isobornyl methacrylate/dicyclopentanyl methacrylate/methacrylic acid copolymer (20/62/10/8), a methyl methacrylate/dicyclopentanyl methacrylate/methacrylic acid copolymer (20/72/8), and a methyl methacrylate/isobornyl methacrylate/methacrylic acid/methacrylic acid copolymer (70/20/5/5). In addition, the values in parentheses represent the mass ratios of the structural units derived from monomers.

The acid value of the resin in the resin particles is preferably 25 mgKOH/g to 100 mgKOH/g, more preferably 30 mgKOH/g to 90 mgKOH/g, and still more preferably 35 mgKOH/g to 80 mgKOH/g.

The weight-average molecular weight of the resin in the resin particles is preferably in a range of 1,000 to 3,00,000, more preferably in a range of 2,000 to 200,000, and still more preferably in a range of 5,000 to 100,000.

From the viewpoint of the jetting stability, the average particle diameter of the resin particles is preferably in a range of 1 nm to 200 nm, more preferably in a range of 3 nm to 200 nm, and still more preferably in a range of 5 nm to 50 nm. Further, the average particle diameter of the resin particles is acquired by measuring the volume average particle diameter using a particle size distribution measuring device, for example, “NANOTRAC UPA-EX150” (product name, manufactured by Nikkiso Co., Ltd.) according to a dynamic light scattering method.

In a case where the colored ink contains resin particles, the content of the resin particles is preferably in a range of 0.1% by mass to 15% by mass, more preferably in a range of 0.5% by mass to 10% by mass, still more preferably in a range of 1% by mass to 8% by mass, and even still more preferably in a range of 2% by mass to 5% by mass with respect to the total amount of the colored ink.

(Organic Solvent)

From the viewpoint of improving jetting stability, it is preferable that the colored ink contains at least one kind of organic solvent.

Examples of the organic solvent include alkanediol (polyhydric alcohol) such as glycerin, 1,2,6-hexanetriol, trimethylolpropane, ethylene glycol, diethylene glycol, triethylene glycol, propylene glycol, dipropylene glycol, tripropylene glycol, 1,3-butanediol, or 2,3-butanediol; alkyl alcohol having 1 to 4 carbon atoms such as ethanol, methanol, butanol, propanol, or isopropanol; and glycol ether such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol, dipropylene glycol monomethyl ether, dipropylene glycol monoethyl ether, dipropylene glycol mono-n-propyl ether, dipropylene glycol mono-iso-propyl ether, or tripropylene glycol monomethyl ether.

The content of the organic solvent is preferably in a range of 5% by mass to 60% by mass, more preferably in a range of 10% by mass to 40% by mass, and still more preferably in a range of 15% by mass to 30% by mass with respect to the total amount of the colored ink.

(Surfactant)

From the viewpoint of improving jetting stability, the colored ink may contain at least one surfactant.

Examples of the surfactant include surfactants described in JP1987-173463A (JP-S62-173463A) and JP1987-183457A (JP-S62-183457A). In addition, examples of the surfactant include anionic surfactants such as dialkyl sulfosuccinate, alkyl naphthalene sulfonate, and a fatty acid salt; nonionic surfactants such as polyoxyethylene alkyl ether, polyoxyethylene alkyl allyl ether, acetylene glycol, and a polyoxyethylene-polyoxypropylene block copolymer; and cationic surfactants such as an alkylamine salt and a quaternary ammonium salt. Further, the surfactant may be a fluorine-based surfactant or a silicone-based surfactant.

In the present disclosure, from the viewpoint of further suppressing breakage of an image to be recorded, it is preferable that the surfactant includes a nonionic surfactant. Among these, it is preferable that the nonionic surfactant is an acetylene glycol derivative (acetylene glycol-based surfactant).

Examples of the acetylene glycol-based surfactant include an alkylene oxide adduct of 2,4,7,9-tetramethyl-5-decyne-4,7-diol and 2,4,7,9-tetramethyl-5-decyne-4,7-diol. Examples of commercially available products thereof include E Series such as OLFINE E1010 and E1020 (manufactured by Nissin Chemical Co., Ltd.).

The content of the surfactant is preferably in a range of 0.01% by mass to 4.0% by mass, more preferably in a range of 0.05% by mass to 2.0% by mass, and still more preferably in a range of 0.1% by mass to 1.0% by mass with respect to the total amount of the colored ink.

(Additive)

The colored ink may contain additives such as a co-sensitizer, an ultraviolet absorbing agent, an antioxidant, a fading inhibitor, a conductive salt, and a basic compound, as necessary.

(Physical Properties)

From the viewpoint of improving the jetting stability, the pH of the colored ink is preferably in a range of 7 to 10 and more preferably in a range of 7.5 to 9.5. The pH is measured at 25° C. using a pH meter, for example, a pH meter (model number “HM-31”, manufactured by DKK-Toa Corporation).

The viscosity of the colored ink is preferably in a range of 0.5 mPa·s to 30 mPa·s, more preferably in a range of 2 mPa·s to 20 mPa·s, still more preferably in a range of 2 mPa·s to 15 mPa·s, and even still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the colored ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, “CBVP-Z”, manufactured by Kyowa Interface Science Co., Ltd.).

<White Ink>

In the present disclosure, the white ink contains a white pigment, a second pigment dispersant, and water.

(White Pigment)

The white pigment may be a pigment exhibiting a white color, and the kind thereof is not particularly limited. The white color denotes a color with no absorption of a specific wavelength or with less absorption of a specific wavelength. Examples of the white pigment include inorganic pigments such as titanium oxide, strontium titanate, barium titanate, zinc oxide, magnesium oxide, zirconium oxide, aluminum oxide, barium sulfate, silica, talc, mica, aluminum hydroxide, calcium silicate, aluminum silicate, and zinc sulfide. The white pigment is preferably particles having titanium atoms and more preferably titanium oxide.

The average particle diameter of the white pigment is preferably in a range of 10 nm to 550 nm, more preferably in a range of 100 nm to 450 nm, and still more preferably in a range of 150 nm to 400 nm. The color reproducibility is enhanced in a case where the average particle diameter is 550 nm or less, and the jetting stability is enhanced in a case where an image is recorded by an ink jet recording method. Further, the light resistance is enhanced in a case where the average particle diameter is 10 nm or greater. In addition, the particle size distribution of the pigment may be any of a wide particle size distribution or a monodispersed particle size distribution. Further, the average particle diameter and the particle size distribution of the pigment are acquired by measuring the volume average particle diameter using a particle size distribution measuring device, for example, “NANOTRAC UPA-EX150” (product name, manufactured by Nikkiso Co., Ltd.) according to a dynamic light scattering method. In a case where the pigment is coated with the pigment dispersant, the average particle diameter of the pigment denotes the average particle diameter of the pigment coated with the pigment dispersant.

From the viewpoints of the image density and the jetting stability, the content of the white pigment is preferably in a range of 5% by mass to 20% by mass and more preferably in a range of 8% by mass to 15% by mass with respect to the total amount of the colored ink.

(Second Pigment Dispersant)

The white ink of the present disclosure contains a second pigment dispersant. The second pigment dispersant is a block polymer.

The block polymer is also referred to as a block copolymer and is a copolymer in which at least two polymers are bonded to each other in a molecule.

Whether or not the polymer contained in the white ink is a block polymer can be determined by, for example, the following method. First, the polymer is separated from the white ink by a separation method such as solvent extraction. The physical properties such as the glass transition temperature are measured by performing analysis on the separated polymer using various analysis methods such as a nuclear magnetic resonance method (NMR), an infrared spectroscopy method (IR), and a thermal analysis method, and thus it is possible to comprehensively determine whether the polymer is a block polymer.

For example, a form in which the block polymer contained in the white ink has two or more glass transition temperatures may also be described as a preferable form in the determining method described above.

It is preferable that the block polymer serving as the second pigment dispersant has a structural unit derived from a hydrophobic monomer and a structural unit derived from a monomer containing an anionic group (hereinafter, referred to as "anionic group-containing monomer"). From the viewpoint of the dispersion stability, the content ratio (c:d) of a structural unit c derived from a hydrophobic monomer to a structural unit d derived from an anionic group-containing monomer is preferably in a range of 10:1 to 1:2.

The structural unit derived from a hydrophobic monomer contained in the block polymer may be used alone or two or more kinds thereof.

The structural unit derived from an anionic group-containing monomer contained in the block polymer may be used alone or two or more kinds thereof.

As the hydrophobic monomer, a monomer containing a hydrocarbon group having 4 or more carbon atoms is preferable, an ethylene unsaturated monomer containing a hydrocarbon group having 4 or more carbon atoms is more preferable, and a (meth)acrylate containing a hydrocarbon group having 4 or more carbon atoms is still more preferable. The hydrocarbon group may be any of a chain-like hydrocarbon group, an alicyclic hydrocarbon group, or an aromatic hydrocarbon group. The number of carbon atoms of the hydrocarbon group is more preferably 4 or more and still more preferably 6 or more. The upper limit of the number of carbon atoms of the hydrocarbon group is, for example, 12.

It is preferable that the block polymer serving as the second pigment dispersant is a polymer having a structural unit derived from a monomer that contains an alicyclic hydrocarbon group having 6 or more carbon atoms.

It is considered that the polymer having a structural unit derived from a monomer that contains an alicyclic hydrocarbon group having 6 or more carbon atoms has a strong interaction with the white pigment and is unlikely to be detached from the surface of the white pigment. Therefore, in a case where the second pigment dispersant is a polymer having a structural unit derived from a monomer that contains an alicyclic hydrocarbon group having 6 or more carbon atoms, the white pigment is sufficiently coated with the second pigment dispersant, and thus the rub resistance is improved.

It is preferable that the anionic group is a carboxy group or a salt of the carboxy group.

From the viewpoints of the dispersion stability, (meth)acrylic acid or β-carboxyethyl acrylate is preferable, and (meth)acrylic acid is more preferable as the anionic group-containing monomer.

The mixing ratio between the white pigment and the second pigment dispersant is preferably in a range of 1:0.06 to 1:3, more preferably in a range of 1:0.125 to 1:2, and still more preferably in a range of 1:0.125 to 1:1.5 in terms of the mass.

(Water)

In the present disclosure, the white ink contains water. The content of water is not particularly limited and is, for example, in a range of 40% by mass to 70% by mass.

(Resin Particles)

In the present disclosure, from the viewpoint of obtaining the rub resistance of the image, it is preferable that the white ink contains at least one kind of resin particles. It is preferable that the white ink contains resin particles which are particles formed of a resin, in addition to the second pigment dispersant.

In particular, in a case where the white ink contains resin particles, the image quality of an image is improved in a case where the pretreatment liquid is applied onto the base material in advance. In a case where the white ink is applied onto the base material onto which the pretreatment liquid has been applied, the aggregating agent contained in the pretreatment liquid comes into contact with the resin particles contained in the white ink and destabilizes the dispersion of the resin particles, and thus the viscosity of the white ink is increased. In this manner, the white ink is fixed on the base material, and the image quality of an image to be recorded is improved.

The preferable aspects of the resin particles contained in the white ink are the same as the preferable aspects of the resin particles contained in the colored ink.

In a case where the white ink contains resin particles, the content of the resin particles is preferably in a range of 0.1% by mass to 15% by mass, more preferably in a range of 0.5% by mass to 10% by mass, still more preferably in a range of 1% by mass to 8% by mass, and even still more preferably in a range of 2% by mass to 6% by mass with respect to the total amount of the white ink.

(Organic Solvent)

From the viewpoint of improving jetting stability, it is preferable that the white ink contains at least one organic solvent.

The preferable aspects of the organic solvent contained in the white ink are the same as the preferable aspects of the organic solvent contained in the colored ink.

The content of the organic solvent is preferably in a range of 5% by mass to 60% by mass, more preferably in a range of 10% by mass to 40% by mass, and still more preferably in a range of 20% by mass to 35% by mass with respect to the total amount of the white ink.

(Surfactant)

From the viewpoint of improving jetting stability, the white ink may contain at least one surfactant.

The preferable aspects of the surfactant contained in the white ink are the same as the preferable aspects of the surfactant contained in the colored ink.

The content of the surfactant is preferably in a range of 0.01% by mass to 4.0% by mass, more preferably in a range of 0.05% by mass to 2.0% by mass, and still more preferably in a range of 0.1% by mass to 1.0% by mass with respect to the total amount of the white ink.

(Additive)

The white ink may contain additives such as a co-sensitizer, an ultraviolet absorbing agent, an antioxidant, a fading inhibitor, a conductive salt, and a basic compound, as necessary.

(Physical Properties)

From the viewpoint of improving the jetting stability, the pH of the white ink is preferably in a range of 7 to 10 and more preferably in a range of 7.5 to 9.5. The pH is measured at 25° C. using a pH meter, for example, a pH meter (model number "HM-31", manufactured by DKK-Toa Corporation).

The viscosity of the white ink is preferably in a range of 0.5 mPa·s to 30 mPa·s, more preferably in a range of 2 mPa·s to 20 mPa·s, still more preferably in a range of 2 mPa·s to 15 mPa·s, and even still more preferably in a range of 3 mPa·s to 10 mPa·s. The viscosity is measured at 25° C. using a viscometer, for example, a TV-22 type viscometer (manufactured by Toki Sangyo Co., Ltd.).

The surface tension of the white ink is preferably 60 mN/m or less, more preferably in a range of 20 mN/m to 50 mN/m, and still more preferably in a range of 30 mN/m to 45 mN/m. The surface tension is measured at 25° C. by a plate method using a surface tension meter, for example, an automatic surface tension meter (product name, "CBVP-Z", manufactured by Kyowa Interface Science Co., Ltd.).

(Relationship Between First Pigment Dispersant and Second Pigment Dispersant)

In the ink set of the present disclosure, in a case where the first pigment dispersant contained in the colored ink and the second pigment dispersant contained in the white ink have a specific relationship, the adhesiveness and the bend resistance of an image recorded material to be obtained by using the ink set are further improved. Hereinafter, the specific relationship will be described in detail.

—Glass Transition Temperature—

In a case where the glass transition temperature of the first pigment dispersant is defined as Tgc, and n number of glass transition temperatures of the second pigment dispersant are respectively defined as Tg1 to Tgn, the maximum value among absolute values of differences between Tgc and Tg1 to Tgn is preferably 50° C. or higher.

The second pigment dispersant is a block polymer. In a case where the second pigment dispersant is, for example, an A-B block polymer consisting of an A block and a B block, the second pigment dispersant has two glass transition temperatures, which are a glass transition temperature derived from the A block and a glass transition temperature derived from the B block, in many cases. However, the second pigment dispersant may have only one glass transition temperature depending on the structures of the A block and the B block. In a case where the second pigment dispersant has one glass transition temperature, the absolute value of the difference between Tgc, which is the glass transition temperature of the first pigment dispersant, and Tg1 is preferably 50° C. or higher. In a case where the second pigment dispersant has two or more glass transition temperatures, it is preferable that the absolute values of the differences between Tgc and each of Tg1 to Tgn are calculated and the maximum value among the calculated values is 50° C. or higher.

In a case where the maximum value is 50° C. or higher, a difference in flexibility occurs between the surface and the inside of the ink film, the breaking elongation rate increases, and thus the bend resistance of an image recorded material to be obtained is further improved. From the viewpoint of further improving the bend resistance of an image recorded material to be obtained, the above-described maximum value (in a case where the glass transition temperature of the first pigment dispersant is defined as Tgc, and n number of glass transition temperatures of the second pigment dispersant are respectively defined as Tg1 to Tgn, the maximum value among the absolute values of the differences between Tgc and each of Tg1 to Tgn) is preferably 75° C. or higher and more preferably 100° C. or higher. From the viewpoint of the rub resistance, the upper limit of the maximum value is, for example, 150° C. or lower and preferably 125° C. or lower.

Further, in a case where the glass transition temperature of the first pigment dispersant is defined as Tgc, and n number of glass transition temperatures of the second pigment dispersant are respectively defined as Tg1 to Tgn, the minimum value among the absolute values of the differences between Tgc and each of Tg1 to Tgn is preferably 5° C. or higher. That is, all the absolute values of the differences between Tgc and each of Tg1 to Tgn are preferably 5° C. or higher.

In a case where the minimum value is 5° C. or higher, the bend resistance of an image recorded material to be obtained is further improved. From the viewpoint of further improving the bend resistance of an image recorded material to be obtained, the minimum value is more preferably 20° C. or higher, still more preferably 35° C. or higher, and particularly preferably 50° C. or higher.

From the viewpoint of the rub resistance, the upper limit of the minimum value is preferably 100° C. or lower and more preferably 65° C. or lower.

That is, in a case where the glass transition temperature of the first pigment dispersant is defined as Tgc, and n number of glass transition temperatures of the second pigment dispersant are respectively defined as Tg1 to Tgn, the absolute values of the differences between Tgc and each of Tg1 to Tgn are preferably 5° C. or higher and 150° C. or lower.

The glass transition temperature Tgc of the first pigment dispersant may be higher or lower than Tg1 to Tgn, which are n number of glass transition temperatures of the second pigment dispersant. In a case where a white ink image is recorded by applying the white ink after a colored ink image is recorded by applying the colored ink onto the base material, Tgc is preferably lower than any of Tg1 to Tgn. The bend resistance of an image recorded material to be obtained is further improved by softening the ink film formed on a side closer to the base material.

The glass transition temperature Tgc of the first pigment dispersant is preferably 150° C. or lower, and the highest temperature among n number of glass transition temperatures Tg1 to Tgn of the second pigment dispersant is preferably 200° C. or lower. In a case where Tgc is 150° C. or lower and the highest temperature among Tg1 to Tgn is 200° C. or lower, the bend resistance of an image recorded material to be obtained is further improved.

From the viewpoint of further improving the bend resistance of an image recorded material to be obtained, Tgc is more preferably 100° C. or lower, and the highest temperature among Tg1 to Tgn is more preferably 160° C. or lower.

As the glass transition temperature, an actually measured value is basically employed. The glass transition temperature is measured under typical measurement conditions using a differential scanning calorimeter, for example, a differential scanning calorimeter (product name, "EXSTAR 6220", manufactured by SII Nanotechnology Inc.). Here, a calculated value that is calculated by the following calculation formula is employed in a case where the measurement is difficult to perform due to decomposition or the like of the material. The glass transition temperature is calculated by Equation 1 below.

$$1/Tg=\Sigma(Xi/Tgi) \quad (1)$$

Here, it is assumed that the polymer as a target for calculation is formed by copolymerizing n kinds of monomers (i represents 1 to n). Xi represents a mass fraction ($\Sigma Xi=1$) of the i-th monomer, and Tgi represents a glass transition temperature (absolute temperature) of the i-th monomer that is a homopolymer. Here, Σ is obtained by summing 1 to n as i. Further, values in Polymer Handbook (3rd Edition) (written by J. Brandrup, E. H. Immergut (Wiley-Interscience, 1989)) are employed as the value (Tgi) of the glass transition temperature of each monomer that is a homopolymer.

—Polymer Structure—

It is preferable that both the first pigment dispersant and the second pigment dispersant are polymers having 30% by mass or greater of a structural unit derived from a monomer that contains a hydrocarbon group having 4 or more carbon atoms with respect to the total amount of the polymer. The first pigment dispersant is a random polymer and the second pigment dispersant is a block polymer, and the polymer structures thereof are different from each other. However, in a case where both the first pigment dispersant and the second pigment dispersant are polymers having 30% by mass or greater of a structural unit derived from a monomer that contains a hydrocarbon group having 4 or more carbon atoms, the hydrophobic interaction between the first pigment dispersant and the second pigment dispersant is strengthened, and the adhesiveness between the colored ink film and the white ink film is improved. As a result, the adhesiveness of an image recorded material to be obtained is improved.

From the viewpoint of further improving the adhesiveness of an image recorded material to be obtained, the content of the structural unit derived from a monomer that contains a hydrocarbon group having 4 or more carbon atoms is more preferably 45% by mass or greater and still more preferably 60% by mass or greater with respect to the total mass of the polymer. From the viewpoint of the bend resistance, the upper limit of the content of the structural unit derived from a monomer that contains a hydrocarbon group having 4 or more carbon atoms is, for example, 90% by mass or less and preferably 80% by mass or less.

Further, from the viewpoint of further improving the adhesiveness of an image recorded material to be obtained, it is preferable that the structural unit derived from a monomer that contains a hydrocarbon group having 4 or more carbon atoms is a structural unit derived from a monomer that contains an alicyclic hydrocarbon group having 4 or more carbon atoms. Since the alicyclic hydrocarbon group has a low degree of freedom of molecules, the hydrophobic interaction between the first pigment dispersant and the second pigment dispersant is further strengthened, and the adhesiveness between the colored ink film and the white ink film is improved. As a result, the adhesiveness of an image recorded material to be obtained is further improved.

—Number Average Molecular Weight—

The absolute value of the difference between the number average molecular weights of the first pigment dispersant and the second pigment dispersant is preferably 10,000 or greater. In a case where the absolute value of the difference between the number average molecular weights is 10,000 or greater, the interaction between the first pigment dispersant and the second pigment dispersant is not extremely strengthened, and the bend resistance of an image recorded material to be obtained is further improved. The upper limit thereof is not particularly set, and may be, for example, 50,000 or less and is preferably 30,000 or less.

From the viewpoint of further improving the bend resistance of an image recorded material to be obtained, it is preferable that the number average molecular weight of the first pigment dispersant is greater than the number average molecular weight of the second pigment dispersant.

The number average molecular weight of the first pigment dispersant is preferably in a range of 5,000 to 40,000 and more preferably in a range of 10,000 to 30,000.

The number average molecular weight of the second pigment dispersant is preferably in a range of 5,000 to 30,000, more preferably in a range of 5,000 to 25,000, and still more preferably in a range of 8,000 to 20,000.

<Pretreatment Liquid>

The ink set of the present disclosure may further contain a pretreatment liquid containing an aggregating agent in addition to the colored ink and the white ink.

(Aggregating Agent)

The aggregating agent contains preferably at least one selected from the group consisting of a polyvalent metal compound, an organic acid, a metal complex, and a cationic polymer and more preferably an organic acid.

—Polyvalent Metal Compound—

Examples of the polyvalent metal compound include salts of alkaline earth metals of a group 2 (such as magnesium and calcium) in the periodic table, transition metals of a group 3 (such as lanthanum) in the periodic table, metals of a group 13 (such as aluminum) in the periodic table, and lanthanides (such as neodymium).

As salts of these metals, salts of organic acids, a nitrate, a chloride, and a thiocyanate described below are preferable.

Among these, preferred examples of the polyvalent metal compound include a calcium salt or magnesium salt of an organic acid (such as formic acid, acetic acid, or a benzoic acid), a calcium salt or magnesium salt of nitric acid, calcium chloride, magnesium chloride, and a calcium salt or magnesium salt of thiocyanic acid.

Further, it is preferable that at least a part of the polyvalent metal compound is dissociated into polyvalent metal ions and counterions in the pretreatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

Among these, from the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Examples of the organic compound containing a carboxy group include (meth)acrylic acid, poly(meth)acrylic acid, acetic acid, formic acid, benzoic acid, glycolic acid, malonic acid, malic acid (preferably DL-malic acid), maleic acid, succinic acid, glutaric acid, pimelic acid, adipic acid, fumaric acid, citric acid, tartaric acid, phthalic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, and nicotinic acid.

Among these, from the viewpoint of the aggregation rate of the ink, as the organic compound containing a carboxy group, di- or higher valent carboxylic acid (hereinafter, also referred to as polyvalent carboxylic acid) is preferable, and dicarboxylic acid is more preferable.

Specifically, as the polyvalent carboxylic acid, malonic acid, malic acid, maleic acid, succinic acid, glutaric acid, pimelic acid, adipic acid, fumaric acid, tartaric acid, 4-methylphthalic acid, or citric acid is preferable, and malonic acid, malic acid, tartaric acid, succinic acid, glutaric acid, pimelic acid, adipic acid, or citric acid is more preferable.

It is preferable that the organic acid has a low pKa (for example, 1.0 to 5.0). In this manner, the surface charge of particles such as resin particles or the pigment stably dispersed in the ink by a weakly acidic functional group such as a carboxy group can be reduced by bringing the ink into contact with an organic acid having a lower pKa to degrade the dispersion stability.

It is preferable that the organic acid has a low pKa, high solubility in water, and a valence of divalent or higher. Further, it is more preferable that the organic acid has a high buffer capacity in a pH region with a pKa lower than the pKa of a functional group (for example, a carboxy group) that stably disperses particles in the ink.

—Metal Complex—

It is preferable that the metal complex contains at least one selected from the group consisting of zirconium, aluminum, and titanium as a metal element.

As the metal complex, a metal complex including at least one selected from the group consisting of acetate, acetylacetonate, methylacetoacetate, ethylacetoacetate, octylene glycolate, butoxyacetylacetonate, lactate, a lactate ammonium salt, and triethanol aminate as a ligand is preferable.

The metal complex may be a commercially available product. Further, various organic ligands, particularly various multidentate ligands that are capable of forming metal chelate catalysts are commercially available. Accordingly, the metal complex may be a metal complex prepared by combining a commercially available organic ligand with a metal.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Fine Chemical Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126", manufactured by Matsumoto Fine Chemical Co., Ltd.) are preferable as the metal complex.

—Cationic Polymer—

In addition, the pretreatment liquid may be in a form containing one or two or more kinds of cationic polymers as an aggregating component. It is preferable that the cationic polymer is a homopolymer of a cationic monomer containing a primary to tertiary amino group or a quaternary ammonium base, or a copolymer or a condensed polymer of a cationic monomer and a non-cationic monomer. The cationic polymer may be used in any form of a water-soluble polymer or water-dispersible latex particles.

Examples of the cationic polymer include a polyvinylpyridine salt, polyalkylaminoethyl acrylate, polyalkylaminoethyl methacrylate, polyvinylimidazole, polyethyleneimine, polybiguanide, polyguanide, polyallylamine, and derivatives thereof.

From the viewpoint of the viscosity of the pretreatment liquid, it is preferable that the weight-average molecular weight of the cationic polymer decreases. In a case where the pretreatment liquid is applied to a recording medium by an ink jet recording method, the weight-average molecular weight thereof is preferably in a range of 1,000 to 500,000, more preferably in a range of 1,500 to 200,000, and still more preferably in a range of 2,000 to 100,000. It is advantageous that the weight-average molecular weight thereof is 1,000 or greater from the viewpoint of aggregation rate. It is advantageous that the weight-average molecular weight thereof is 500,000 or less from the viewpoint of jetting reliability. However, in a case where the pretreatment liquid is applied to a recording medium by a method other than the ink jet recording method, the weight-average molecular weight thereof is not limited thereto.

The pretreatment liquid of the present disclosure may contain only one or two or more kinds of aggregating agents.

The content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

(Other Components)

The pretreatment liquid may contain other components as necessary in addition to the aggregating agent. Examples of other components that may be contained in the pretreatment liquid include known additives such as an organic solvent, resin particles, a surfactant, a solid wetting agent, colloidal silica, an inorganic salt, a fading inhibitor, an emulsification stabilizer, a penetration enhancer, an ultraviolet absorbing agent, a preservative, a fungicide, a pH adjuster, a viscosity adjuster, a rust inhibitor, a chelating agent, and a water-soluble polymer compound (for example, water-soluble polymer compounds described in paragraphs 0026 to 0080 of JP2013-001854A).

(Physical Properties)

The pH of the pretreatment liquid is preferably 0.1 to 4.5, more preferably 0.2 to 4.0, from the viewpoint of the aggregation rate of the ink. The pH is measured at 25° C. using a pH meter, for example, a pH meter (model number "HM-31", manufactured by DKK-Toa Corporation).

From the viewpoint of the aggregation rate of the ink, the viscosity of the pretreatment liquid is preferably in a range of 0.5 mPa·s to 10 mPa·s and more preferably in a range of 1 mPa·s to 5 mPa·s. The viscosity is a value measured at 25° C. using a viscometer. The viscosity is measured at 25° C. using a viscometer, for example, a TV-22 type viscometer (manufactured by Toki Sangyo Co., Ltd.).

The surface tension of the pretreatment liquid is preferably 60 mN/m or less, more preferably in a range of 20 mN/m to 50 mN/m, and still more preferably in a range of 30 mN/m to 45 mN/m. The surface tension is a value measured at a temperature of 25° C. The surface tension is measured at 25° C. by a plate method using a surface tension meter, for example, an automatic surface tension meter (product name, "CBVP-Z", manufactured by Kyowa Interface Science Co., Ltd.).

[Image Recording Method]

In an image recording method of the present disclosure, it is preferable that the colored ink and the white ink are applied onto the impermeable base material by an ink jet recording method using the ink set. The white ink may be applied onto the impermeable base material after the colored ink is applied thereto, or the colored ink may be applied onto the impermeable base material after the white ink is applied thereto. In a case where the impermeable base material is transparent and is used for reverse printing, it is preferable that the white ink is applied onto the impermeable base material after the colored ink is applied thereto. That is, it is more preferable that the image recording method of the present disclosure includes a step of applying the colored ink onto the impermeable base material by an ink jet recording method and a step of applying the white ink by an ink jet recording method onto a colored ink film formed by the application of the colored ink.

(Colored Ink Applying Step)

It is preferable that the image recording method of the present disclosure includes a step of applying the colored ink onto the impermeable base material by an ink jet recording method (hereinafter, referred to as "colored ink applying step").

—Impermeable Base Material—

In the present disclosure, the impermeability in the impermeable base material denotes a property that the water absorption rate in 24 hours which is measured in conformity with ASTM D570-98 (2018) is 2.5% or less. Here, the unit "%" of the water absorption rate is on a mass basis. The water absorption rate is preferably 1.0% or less and more preferably 0.5% or less.

Examples of the material of the impermeable base material include glass, a metal (such as aluminum, zinc, or copper), and a resin (such as polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, nylon, or an acrylic resin).

It is preferable that the material of the impermeable base material is a resin.

Examples of the material of the impermeable base material are as described above, but polypropylene, polyethylene, polyethylene terephthalate, nylon, an acrylic resin, or polyvinyl chloride is preferable from the viewpoint of versatility.

As the shape of the impermeable base material, a sheet-like (film-like) or a plate-like impermeable base material is preferable. Examples of the impermeable base material having such a shape include a glass plate, a metal plate, a resin sheet (resin film), paper on which plastic is laminated, paper on which a metal is laminated or vapor-deposited, and a plastic sheet (plastic film) on which a metal is laminated or vapor-deposited.

Examples of the impermeable base material made of a resin include a resin sheet (resin film), and more specific examples thereof include a flexible packaging material for packaging food or the like and a panel for guiding the floor of a mass retailer.

Examples of the impermeable base material include a textile (woven fabric) or non-woven fabric formed of impermeable fibers in addition to a sheet-like (film-like) or plate-like impermeable base material.

Further, the thickness of the impermeable base material is preferably in a range of 0.1 μm to 1,000 μm, more preferably in a range of 0.1 μm to 800 μm, and still more preferably in a range of 1 μm to 500 μm.

The impermeable base material may be subjected to a hydrophilization treatment. Examples of the hydrophilization treatment include a corona treatment, a plasma treatment, a heat treatment, an abrasion treatment, a light irradiation treatment (such as a UV treatment), and a flame treatment, but the hydrophilization treatment is not limited thereto. The corona treatment can be performed using, for example, Corona Master (product name, "PS-10S", manufactured by Shinko Electric & Instrumentation Co., Ltd.). The conditions for the corona treatment may be appropriately selected according to the kind of the impermeable base material and the like.

—Ink Jet Recording Method—

The method of jetting the ink in the ink jet recording method is not particularly limited, and any of known methods such as an electric charge control method of jetting an ink using an electrostatic attraction force, a drop-on-demand method (pressure pulse method) using a vibration pressure of a piezoelectric element, an acoustic ink jet recording method of jetting an ink using a radiation pressure by converting an electric signal into an acoustic beam and irradiating the ink with the acoustic beam, and a thermal ink jet (bubble jet (registered trademark)) method of heating an ink to form air bubbles and using the generated pressure may be used.

As the ink jet recording method, particularly, an ink jet recording method, described in JP1979-59936A (JP-S54-59936A), of jetting an ink from a nozzle using an action force caused by a rapid change in volume of the ink after being subjected to an action of thermal energy can be effectively used. Further, as the ink jet recording method, the method described in paragraphs 0093 to 0105 of JP2003-306623A can also be employed.

The application of the ink onto the impermeable base material using the ink jet recording method can be performed by allowing the ink to be jetted from a nozzle of an ink jet head.

Examples of the system of the ink jet head include a shuttle system of performing recording while scanning a short serial head in the width direction of a recorded medium and a line system of using a line head in which recording elements are aligned in correspondence with the entire area of one side of a recorded medium.

In the line system, image recording can be performed on the entire surface of the recorded medium by scanning the recorded medium in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable that the application of the ink is performed using an ink jet head having a resolution of 300 dpi or greater (more preferably 600 dpi or greater and still more preferably 800 dpi or greater). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pico liter (pL) to 10 pL and more preferably in a range of 1.5 pL to 6 pL. Further, from the viewpoints of improving the image unevenness and improving connection of continuous gradations, it is also effective that the ink is jetted by combining different liquid droplet amounts.

(White Ink Applying Step)

It is preferable that the image recording method of the present disclosure includes a step of applying the white ink by an ink jet recording method onto the colored ink film formed by the application of the colored ink (hereinafter, referred to as "white ink applying step").

The details of the ink jet recording method are the same as the details of the ink jet recording method in the colored ink applying step.

It is preferable that the image recording method of the present disclosure includes a step of applying the pretreatment liquid onto the impermeable base material in advance. That is, it is preferable that the image recording method of the present disclosure includes a step of applying the pretreatment liquid onto the impermeable base material (hereinafter, referred to as "pretreatment liquid adding step"), a step of applying the colored ink by an ink jet recording method onto the impermeable base material onto which the pretreatment liquid has been applied, and a step of applying the white ink by an ink jet recording method onto the colored ink film formed by the application of the colored ink.

(Pretreatment Liquid Adding Step)

The application of the pretreatment liquid in the pretreatment liquid adding step can be performed by employing a known application method such as a coating method, an ink jet recording method, or a dipping method.

Examples of the coating method include known coating methods using a bar coater, an extrusion die coater, an air doctor coater, a blade coater, a rod coater, a knife coater, a squeeze coater, and a reverse roll coater.

The details of the ink jet recording method are the same as the details of the ink jet recording method in the colored ink applying step.

The application amount of the pretreatment liquid is preferably in a range of 0.5 $g/m^2$ to 2.5 $g/m^2$ and more preferably in a range of 1.0 $g/m^2$ to 2.0 $g/m^2$.

Further, the impermeable base material may be heated before the application of the pretreatment liquid. The heating temperature may be appropriately set according to the kind of the impermeable base material and the composition of the pretreatment liquid, but the temperature of the impermeable base material is set to be preferably in a range of 30° C. to 70° C. and more preferably in a range of 30° C. to 60° C.

In the pretreatment liquid adding step, the pretreatment liquid applied onto the impermeable base material may be heated and dried. Examples of the means for heating and drying the pretreatment liquid include known heating means such as a heater, known air blowing means such as a dryer, and means for combining these.

Examples of the method of heating and drying the pretreatment liquid include a method of applying heat using a heater or the like from a side of the impermeable base material opposite to the surface onto which the pretreatment liquid has been applied; a method of applying warm air or hot air to the surface of the impermeable base material onto which the pretreatment liquid has been applied; a method of applying heat using an infrared heater from the surface of the impermeable base material onto which the pretreatment liquid has been applied or from a side of the impermeable base material opposite to the surface onto which the pretreatment liquid has been applied; and a method of combining a plurality of these methods.

The heating temperature of heating and drying the pretreatment liquid is preferably 35° C. or higher and more preferably 40° C. or higher. The upper limit of the heating temperature is not particularly limited, but is preferably 100° C., more preferably 90° C., and still more preferably 70° C.

The time of heating and drying the pretreatment liquid is not particularly limited, but is preferably in a range of 0.5 seconds to 60 seconds, more preferably in a range of 0.5 seconds to 20 seconds, and still more preferably in a range of 0.5 seconds to 10 seconds.

[Other Steps]

The image recording method of the present disclosure may include a drying step of heating and drying the applied ink after the step of applying the ink.

Examples of the means for heating and drying the ink include known heating means such as a heater, known air blowing means such as a dryer, and means for combining these.

Examples of the method of heating and drying the ink include a method of applying heat using a heater or the like from a side of the impermeable base material opposite to the surface onto which the ink has been applied; a method of applying warm air or hot air to the surface of the impermeable base material onto which the ink has been applied; a method of applying heat using an infrared heater from the surface of the impermeable base material onto which the ink has been applied or from a side of the impermeable base material opposite to the surface onto which the ink has been applied; and a method of combining a plurality of these methods.

The heating temperature of heating and drying the ink is preferably 55° C. or higher, more preferably 60° C. or higher, and still more preferably 65° C. or higher. The upper limit of the heating temperature is not particularly limited, but is, for example, 100° C. and preferably 90° C.

The time of heating and drying the ink is not particularly limited, but is preferably in a range of 3 seconds to 60 seconds, more preferably in a range of 5 seconds to 60 seconds, and still more preferably in a range of 10 seconds to 45 seconds.

EXAMPLES

Hereinafter, the present disclosure will be described in more detail based on examples, but the present disclosure is not limited to the following examples unless the gist thereof is overstepped.

In the examples, the glass transition temperature was measured under typical measurement conditions using a differential scanning calorimeter, for example, a differential scanning calorimeter (product name, "EXSTAR 6220", manufactured by SII Nanotechnology Inc.).

In the examples, the number average molecular weight was measured using gel permeation chromatography (GPC). The measurement according to gel permeation chromatography (GPC) was performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement was performed under measurement conditions of a sample concentration of 0.45% by mass, a flow rate of 0.35 ml/min, a sample injection volume of 10 μl, and a measurement temperature of 40° C. using an RI detector. Further, the calibration curve was prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Examples 1 to 14 and Comparative Examples 1 to 3

First, a magenta pigment dispersion liquid and a white pigment dispersion liquid were respectively prepared, and various additives were added to the prepared magenta pigment dispersion liquid and the prepared white pigment dispersion liquid, thereby preparing a magenta ink and a white ink.

Pigment dispersants P1 to P5 and pigment dispersants Q1 to Q9 used in the preparation of the magenta pigment dispersion liquid and the white pigment dispersion liquid were prepared by the following methods. Further, the pigment dispersants Q1 to Q9 were prepared with reference to the methods described in JP2014-40553A and JP2015-63688A.

(Pigment Dispersant P1)

A reaction container provided with a gas introduction pipe, a thermometer, a condenser, and a stirrer was charged with 89.7 parts by mass of butyl diglycol, and the inside thereof was substituted with nitrogen gas. The inside of the reaction container was heated to 110° C., and a mixed solution of 40 parts by mass of lauryl methacrylate, 47 parts by mass of styrene, 47 parts by mass of acrylic acid, and 7.0 parts by mass of dimethyl 2,2'-azobis(2-methylpropionate) (product name, "V-601", manufactured by FUJIFILM Wako Pure Chemical Corporation, hereinafter referred to as "V-601") serving as a polymerization initiator was added dropwise thereto over 2 hours to carry out a polymerization reaction. After completion of the dropwise addition, the solution was allowed to further react at 110° C. for 3 hours, 0.6 parts by mass of V-601 was added thereto, and the solution was allowed to further react at 110° C. for 1 hour, thereby obtaining a polymer having a number average molecular weight (Mn) of 28,000. Further, the solution was cooled to room temperature, and 51.2 parts by mass of dimethylaminoethanol was added thereto for neutralization. The amount of dimethylaminoethanol was the amount set such that acrylic acid was 100% neutralized. Further, 168.7 parts by mass of water was added to the solution, thereby obtaining an aqueous solution of the pigment dispersant P1 in which the concentration of solid contents was 24% by mass.

The pigment dispersant P1 was a random polymer, and the mass ratio of each structural unit constituting the polymer (lauryl methacrylate:styrene:acrylic acid) was 30:35:35. Further, the structural unit derived from acrylic acid was 100% neutralized with dimethylaminoethanol, and the structural units derived from acrylic acid in the pigment dispersants P2 to P5 described below were also similarly neutralized. Further, the number average molecular weight of the pigment dispersant P1 was 28,000, and the glass transition temperature thereof was 29.7° C.

(Pigment Dispersant P2)

The pigment dispersant P2 was obtained by the same method as the method for the pigment dispersant P1 except that a mixed solution of 10 parts by mass of lauryl methacrylate, 47 parts by mass of styrene, 45 parts by mass of methacrylic acid, and 7.0 parts by mass of V-601 was added dropwise to a reaction container.

The pigment dispersant P2 was a random polymer, and the mass ratio of each structural unit constituting the polymer (lauryl methacrylate:styrene:methacrylic acid) was 10:46:44. Further, the number average molecular weight of the pigment dispersant P2 was 26,500, and the glass transition temperature thereof was 113.2° C.

(Pigment Dispersant P3)

The pigment dispersant P3 was obtained by the same method as the method for the pigment dispersant P1 except that a mixed solution of 40 parts by mass of isobornyl methacrylate, 38 parts by mass of styrene, 22 parts by mass of methacrylic acid, and 7.0 parts by mass of V-601 was added dropwise to a reaction container.

The pigment dispersant P3 was a random polymer, and the mass ratio of each structural unit constituting the polymer (isobornyl methacrylate:styrene:methacrylic acid) was 40:38:22. Further, the number average molecular weight of the pigment dispersant P3 was 27,000, and the glass transition temperature thereof was 151° C.

(Pigment Dispersant P4)

The pigment dispersant P4 was obtained by the same method as the method for the pigment dispersant P1 except that a mixed solution of 40 parts by mass of lauryl methacrylate, 97 parts by mass of methyl methacrylate, 30 parts by mass of methacrylic acid, and 7.0 parts by mass of V-601 was added dropwise to a reaction container.

The pigment dispersant P4 was a random polymer, and the mass ratio of each structural unit constituting the polymer (lauryl methacrylate:methyl methacrylate:methacrylic acid) was 24:58:18. Further, the number average molecular weight of the pigment dispersant P4 was 25,000, and the glass transition temperature thereof was 55.1° C.

(Pigment Dispersant P5)

The pigment dispersant P5 was obtained by the same method as the method for the pigment dispersant P1 except that a mixed solution of 17 parts by mass of lauryl methacrylate, 20 parts by mass of styrene, 20 parts by mass of acrylic acid, and 7.0 parts by mass of V-601 was added dropwise to a reaction container.

The pigment dispersant P5 was a random polymer, and the mass ratio of each structural unit constituting the polymer (lauryl methacrylate:styrene:acrylic acid) was 30:35:35. Further, the number average molecular weight of the pigment dispersant P5 was 12,000, and the glass transition temperature thereof was 29.7° C.

(Pigment Dispersant Q1)

A 500 ml separable flask equipped with a reflux pipe, a gas introduction device, a thermometer, and a stirring device was charged with 186.6 parts by mass of triethylene glycol monobutyl ether (hereinafter referred to as "TEGmBE"), 1.0 part by mass of iodine, 3.7 parts by mass of 2,2'-azobis(4-methoxy-2,4-dimethylvaleronitrile) (product name, "V-70", manufactured by FUJIFILM Wako Pure Chemical Corporation, hereinafter, referred to as "V-70"), 44.0 parts by mass of isobornyl methacrylate, 20 parts by mass of cyclohexyl methacrylate, and 0.2 parts by mass of iodosuccinimide, and the mixture was polymerized at 45° C. for 5 hours while nitrogen was allowed to flow in the container, thereby obtaining a solution of an A polymer block. The polymerization rate (yield) of the A polymer block calculated from the solid content of the obtained solution of the A polymer block was 99.0%. In addition, the number average molecular weight (Mn) measured by GPC was 5,500. Next, the polymerization temperature was lowered to 40° C., and 23.5 parts by mass of isobornyl methacrylate, 17.6 parts by mass of cyclohexyl methacrylate, 17.6 parts by mass of methacrylic acid, and 1.2 parts by mass of V-70 were added to the obtained solution of the A polymer block. Further, a B polymer block was formed by carrying out the polymerization for 4 hours, increasing the temperature to 70° C., and carrying out the polymerization for 1 hour, thereby obtaining a solution of an A-B block polymer. The solid content of the obtained solution of the A-B block polymer was 41.2%, and the polymerization rate of the B polymer block calculated from the solid content was approximately 100%. In addition, the number average molecular weight (Mn) of the A-B block polymer was 11,000. After the obtained solution of the A-B block polymer was cooled, 66.1 parts by mass of TEGmBE was added thereto to adjust the concentration of solid contents to 33.3% by mass. This A-B block polymer was defined as the pigment dispersant Q1.

The pigment dispersant Q1 was an A-B block polymer, and the mass ratio of each structural unit constituting the polymer (isobornyl methacrylate:cyclohexyl methacrylate: methacrylic acid) was 55:31:14. Further, the glass transition temperatures of the pigment dispersant Q1 were 92° C. and 154° C.

(Pigment Dispersant Q2)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 44 parts by mass of isobornyl methacrylate, 14.08 parts by mass of cyclohexyl methacrylate, and 0.2 parts by mass of iodosuccinimide in the preparation of the solution of the A polymer block. The number average molecular weight (Mn) measured by GPC was 5,000. Further, a solution of an A-B block polymer was obtained by the same method as the method for the pigment dispersant Q1. The number average molecular weight (Mn) of the A-B block polymer was 9,500.

The pigment dispersant Q2 was an A-B block polymer, and the mass ratio of each structural unit constituting the polymer (isobornyl methacrylate:cyclohexyl methacrylate: methacrylic acid) was 58:27:15. Further, the glass transition temperatures of the pigment dispersant Q2 were 137.9° C. and 154° C.

(Pigment Dispersant Q3)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 44 parts by mass of isobornyl methacrylate, 84 parts by mass of cyclohexyl methacrylate, and 0.2 parts by mass of iodosuccinimide in the preparation of the solution of the A polymer block. The number average molecular weight (Mn) measured by GPC was 4,500. A solution of an A-B block polymer was obtained by the same method as the method for the pigment dispersant Q1 except that 23.5 parts by mass of isobornyl methacrylate, 35.25 parts by mass of cyclohexyl methacrylate, 58.75 parts by mass of methacrylic acid, and 1.2 parts by mass of V-70 were added to the solution of the A polymer block. The number average molecular weight (Mn) of the A-B block polymer was 10,000.

The pigment dispersant Q3 was an A-B block polymer, and the mass ratio of each structural unit constituting the polymer (isobornyl methacrylate:cyclohexyl methacrylate: methacrylic acid) was 27:49:24. Further, the glass transition temperatures of the pigment dispersant Q3 were 108.5° C. and 163.3° C.

(Pigment Dispersant Q4)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 44 parts by mass of isobornyl methacrylate, 31 parts by mass of cyclohexyl methacrylate, 145 parts by mass of methacrylic acid, and 0.2 parts by mass of iodosuccinimide in the preparation of the solution of the A polymer block. The number average molecular weight (Mn) measured by GPC was 6,500. A solution of an A-B block polymer was obtained by the same method as the method for the pigment dispersant Q1 except that 24 parts by mass of isobornyl methacrylate, 35 parts by mass of methacrylic acid, and 1.2 parts by mass of V-70 were added to the solution of the A polymer block. The number average molecular weight (Mn) of the A-B block polymer was 12,000.

The pigment dispersant Q4 was an A-B block polymer, and the mass ratio of each structural unit constituting the polymer (isobornyl methacrylate:cyclohexyl methacrylate: methacrylic acid) was 24:11:65. Further, the glass transition temperatures of the pigment dispersant Q4 were 0° C. and 203.1° C.

(Pigment Dispersant Q5)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 16 parts by mass of isobornyl methacrylate, 69.3 parts by mass of methyl methacrylate, 21.3 parts by mass of acrylic acid, and 0.2 parts by mass of iodosuccinimide in the preparation of the solution of the A polymer block. The number average molecular weight (Mn) measured by GPC was 4,300. A solution of an A-B block polymer was obtained by the same method as the method for the pigment dispersant Q1 except that 23.5 parts by mass of methyl methacrylate, 35.25 parts by mass of methacrylic acid, and 1.2 parts by mass of V-70 were added to the solution of the A polymer block. The number average molecular weight (Mn) of the A-B block polymer was 9,800.

The pigment dispersant Q5 was an A-B block polymer, and the mass ratio of each structural unit constituting the polymer (isobornyl methacrylate:methyl methacrylate: methacrylic acid:acrylic acid) was 10:56:21:13. Further, the glass transition temperatures of the pigment dispersant Q5 were 113.7° C. and 170.3° C.

(Pigment Dispersant Q6)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 38 parts by mass of lauryl methacrylate, 70.6 parts by mass of acrylic acid, and 0.2 parts by mass of iodosuccinimide in the preparation of the solution of the A polymer block. The number average molecular weight (Mn) measured by GPC was 5,600. A solution of an A-B block polymer was obtained by the same method as the method for the pigment dispersant Q1 except that 15 parts by mass of lauryl methacrylate, 23.18 parts by mass of methyl methacrylate, 30 parts by mass of methacrylic acid, and 1.2 parts by mass of V-70 were added to the solution of the A polymer block. The number average molecular weight (Mn) of the A-B block polymer was 11,500.

The pigment dispersant Q6 was an A-B block polymer, and the mass ratio of each structural unit constituting the polymer (lauryl methacrylate:methyl methacrylate:methacrylic acid:acrylic acid) was 30:13:17:40. Further, the glass transition temperatures of the pigment dispersant Q6 were 21.3° C. and 79.7° C.

(Pigment Dispersant Q7)

A solution of an A polymer block was obtained by the same method as the method for the pigment dispersant Q1 except that a container was charged with 186.6 parts by mass of TEGmBE, 1.0 parts by mass of iodine, 3.7 parts by mass of V-70, 88 parts by mass of isobornyl methacrylate, 40.5 parts by mass of cyclohexyl methacrylate, and 0.2 parts by mass of iodosuccinimide in the preparation of the solution of the A polymer block. The number average molecular weight (Mn) measured by GPC was 10,000. A solution of an A-B block polymer was obtained by the same method as the method for the pigment dispersant Q1 except that 47 parts by mass of isobornyl methacrylate, 35.2 parts by mass of cyclohexyl methacrylate, 35.2 parts by mass of methacrylic acid, and 1.2 parts by mass of V-70 were added to the solution of the A polymer block. The number average molecular weight (Mn) of the A-B block polymer was 22,000.

The pigment dispersant Q7 was an A-B block polymer, and the mass ratio of each structural unit constituting the polymer (isobornyl methacrylate:cyclohexyl methacrylate: methacrylic acid) was 55:31:14. Further, the glass transition temperatures of the pigment dispersant Q7 were 92° C. and 154° C.

(Pigment Dispersant Q8)

A 500 ml separable flask equipped with a reflux pipe, a gas introduction device, a thermometer, and a stirring device was charged with 198.2 parts by mass of diethylene glycol monobutyl ether (hereinafter, referred to as "DEGmBE"), 1.0 part by mass of iodine, 3.7 parts by mass of V-70, 120 parts by mass of methyl methacrylate, 67.2 parts by mass of cyclohexyl methacrylate, 28.8 parts by mass of acrylic acid, and 0.17 parts by mass of diphenylmethane as a catalyst. The mixture was polymerized at 45° C. for 5 hours while nitrogen was allowed to flow, thereby obtaining a solution of an A polymer block. The polymerization rate (yield) of the A polymer block calculated from the solid content of the solution was 96.2%. Further, the number average molecular weight (Mn) measured by GPC was 5,200. Next, the temperature of the polymerization was lowered to 40° C., and 35.2 parts by mass of benzyl methacrylate and 1.2 parts by mass of V-70 were added to the obtained solution of the A polymer block. Further, a B polymer block was formed by carrying out the polymerization for 4 hours, increasing the temperature to 70° C., and carrying out the polymerization for 1 hour, thereby obtaining a solution of an A-B block copolymer.

The solid content of the obtained solution of the A-B block copolymer was 40.8%, and the polymerization rate of the B polymer block calculated from the solid content was approximately 100%. After the solution of the A-B block copolymer was cooled, 66.1 parts by mass of DEGmBE was added thereto to adjust the solid content to 33.3% by mass. This A-B block copolymer was defined as a pigment dispersant Q8. The number average molecular weight (Mn) of the pigment dispersant Q8 was 5,800.

The pigment dispersant Q8 was an A-B block polymer, and the mass ratio of each structural unit constituting the polymer (cyclohexyl methacrylate:benzyl methacrylate:methyl methacrylate:acrylic acid) was 27:14:48:11. Further, the glass transition temperatures of the pigment dispersant Q8 were 54° C. and 94° C.

(Pigment Dispersant Q9)

A solution of an A polymer block was obtained by the same method as the method for the pigment dispersant Q8 except that a container was charged with 198.2 parts by mass of DEGmBE, 1.0 part by mass of iodine, 3.7 parts by mass of V-70, 116.9 parts by mass of methyl methacrylate, 60.6 parts by mass of isobornyl methacrylate, 28.8 parts by mass of acrylic acid, and 0.17 parts by mass of diphenylmethane as a catalyst in the preparation of the solution of the A polymer block. The number average molecular weight (Mn) measured by GPC was 5,400. A solution of an A-B block polymer was obtained by the same method as the method for the pigment dispersant Q8 except that 35.2 parts by mass of benzyl methacrylate and 1.2 parts by mass of V-70 were added to the solution of the A polymer block. The number average molecular weight (Mn) of the A-B block polymer was 6,200.

The pigment dispersant Q9 was an A-B block polymer, and the mass ratio of each structural unit constituting the polymer (isobornyl methacrylate:benzyl methacrylate: methyl methacrylate:acrylic acid) was 25:15:48:12. Further, the glass transition temperatures of the pigment dispersant Q9 were 54° C. and 141.7° C.

(Magenta Ink M1)

—Preparation of Magenta Pigment Dispersion Liquid MA1—

150 parts by mass of the pigment dispersant P1 was dissolved in water, and a polymer aqueous solution was prepared such that the concentration of the pigment dispersant P1 was set to approximately 25% by mass. 180 parts by mass of the polymer aqueous solution, 90 parts by mass of PR-122 (FUJI Fast Red (registered trademark), manufactured by Fuji Pigment Co., Ltd.), which is a magenta pigment, and 171.9 parts by mass of water were mixed with each other, thereby obtaining a mixed solution. A potassium hydroxide aqueous solution was added to the obtained mixed solution, and the pH after neutralization was adjusted to 8.7. Next, the mixed solution after neutralization was subjected to a dispersion treatment for 3 hours using a bead mill (bead diameter: 0.1 mmφ, zirconia beads). In this manner, a magenta pigment dispersion liquid in which the magenta pigment was dispersed by the pigment dispersant P1 was obtained. The concentration of the pigment was 15% by mass.

—Preparation of Magenta Ink M1—

A magenta ink M1 was prepared by mixing the following components.

Magenta pigment dispersion liquid MA1 (concentration of pigment: 15% by mass): 46.7% by mass Dispersion liquid of resin particles A (concentration of solid contents: 23.2% by mass): 12.9% by mass Organic solvent: propylene glycol: 26.0% by mass Surfactant: OLFINE E1010 (manufactured by Nissin Chemical Co., Ltd.): 0.25% by mass Water: remaining amount such that total amount of composition of ink reached 100% by mass The resin particles A were prepared by the following method.

A 2 L three-neck flask (reaction container) provided with a stirrer, a thermometer, a reflux condenser, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of dimethyl 2,2'-azobis(2-methylpropionate) (product name, "V-601", manufactured by FUJIFILM Wako Pure Chemical Corporation) as a polymerization initiator was added dropwise to the methyl ethyl ketone in the reaction container at a constant speed such that the dropwise addition was completed for 2 hours while the reflux state in the reaction container was maintained. Further, the reflux state was maintained until the reaction was completed. After completion of the dropwise addition, the reaction solution was stirred for 1 hour and subjected to an operation of the following step (1).

Step (1): A solution consisting of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours.

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20 mass % maleic acid anhydride aqueous solution (corresponding to 0.3% by mass as maleic acid with respect to the copolymer), and 40.77 g of a 2 mol/L sodium hydroxide aqueous solution were added to the solution, and the temperature of the liquid in the reaction container was increased to 70° C.

Next, 380 g of distilled water was added dropwise to the liquid, which had been heated to 70° C., at a speed of 10 mL/min. Thereafter, a total amount of 287.0 g of isopropanol, methyl ethyl ketone, and distilled water was distilled off by maintaining the temperature of the liquid in the reaction container at 70° C. for 1.5 hours under reduced pressure. 0.278 g (440 ppm as benzisothiazolin-3-one with respect to solid content of polymer) of PROXEL GXL (S) (manufactured by Arch Chemicals, Inc.) was added to the obtained liquid.

The obtained liquid was filtered through a filter with a pore size of 1 μm, and the filtrate was collected, thereby obtaining an aqueous dispersion liquid (concentration of solid contents: 23.2% by mass) of the resin particles A formed of a copolymer of methyl methacrylate, isobornyl methacrylate, methacrylic acid, and sodium methacrylate at a mass ratio of 70/20/5/5. The volume average particle diameter of the resin particles A was 5.0 nm, and the weight-average molecular weight (Mw) thereof was 60,000.

(Magenta Inks M2 to M7)

Magenta inks M2 to M7 were prepared by the same method as the method for the magenta ink M1, using the resin particles, the surfactant, and the organic solvent listed in Table 1 after the pigment dispersant was changed to the pigment dispersant listed in Table 1 and a pigment dispersion liquid was prepared by the same method as the method for the magenta pigment dispersion liquid MA1. In the magenta inks M6 and M7, BYK-347 (manufactured by BYK-Chemie Japan K.K.) was used as the surfactant.

The resin particles B contained in the magenta inks M6 and M7 were prepared by the following method.

A three-neck flask equipped with a stirrer, a thermometer, a reflux condenser, and a nitrogen gas introduction pipe was charged with water (250 g), 12-methacrylamidododecanoic acid (7.0 g), potassium hydrogen carbonate (0.17 g), and isopropanol (20 g) and was heated to 85° C. under a nitrogen stream. Here, a mixed solution consisting of 4,4'-azobis(4-cyanovaleric acid) (radical polymerization initiator, product name, "V-501", manufactured by FUJIFILM Wako Pure Chemical Corporation) (0.11 g), potassium hydrogen carbonate (0.08 g), and water (9 g) was added thereto, and the mixture was stirred for 10 minutes. Next, a monomer solution consisting of styrene (30 g) and methyl methacrylate (63 g) was added dropwise to the three-neck flask at a constant speed such that the dropwise addition was completed in 3 hours. Further, a mixed solution consisting of V-501 (0.06 g), potassium hydrogen carbonate (0.04 g), and water (6 g) was added to the solution twice, immediately after the start of dropwise addition of the monomer solution and 1.5 hours after the start of dropwise addition of the monomer solution. After completion of the dropwise addition of the monomer solution, the mixed solution was stirred for 1 hour. Subsequently, a mixed solution consisting of V-501 (0.06 g), potassium hydrogen carbonate (0.04 g), and water (6 g) was added to the obtained reaction mixture, and the mixture was further stirred for 3 hours. The obtained reaction mixture was filtered through a mesh having a mesh size of 50 μm to obtain an aqueous dispersion liquid of the resin particles B which was a copolymer of styrene/methyl methacrylate/12-methacrylamidododecanoic acid (=30/63/7 [mass ratio]). The obtained aqueous dispersion liquid of the resin particles B had a pH of 8.5, a concentration of solid contents of 25% by mass, a volume average particle diameter of 30 nm, a weight-average molecular weight (Mw) of 250,000, and a Tg of 96° C.

The contents (% by mass) of the pigment, the pigment dispersant, the resin particles, the organic solvent, and the surfactant with respect to the total amount of the magenta ink are listed in Table 1. Further, the type, the form, the type of the monomer constituting the polymer, the content thereof (% by mass), and the glass transition temperature Tgc of the pigment dispersant contained in each magenta ink are listed in Table 1. In the columns of the forms, "block" denotes a block polymer and "random" denotes a random polymer. In regard to the glass transition temperature Tgc, only an example in which the pigment dispersant contained in the magenta ink was a random polymer is described. In Table 1, EGmHE denotes ethylene glycol monohexyl ether. Each of the contents of water is the remaining amount set such that the total amount of the ink reaches 100% by mass, and is listed as "remaining amount" in Table 1.

A white ink W1 was prepared by mixing the following components.

White pigment dispersion liquid WA1 (concentration of pigment: 45% by mass): 26.7% by mass Dispersion liquid of resin particles A (concentration of solid contents: 23% by mass): 17.2% by mass Organic solvent: propylene glycol: 25.0% by mass

TABLE 1

| | | | M1 | M2 | M3 | M4 | M5 | M6 | M7 |
|---|---|---|---|---|---|---|---|---|---|
| Pigment dispersant | | Type | P1 | P2 | P3 | P4 | P5 | P1 | Q7 |
| | | Form | Random | Random | Random | Random | Random | Random | Block |
| | | Tgc (° C.) | 29.7 | 113.2 | 151 | 55.1 | 29.7 | 29.7 | — |
| | Composition of pigment dispersant | Lauryl methacrylate | 30 | 10 | — | 24 | 30 | 30 | — |
| | | Isobornyl methacrylate | — | — | 40 | — | — | — | 55 |
| | | Cyclohexyl methacrylate | — | — | — | — | — | — | 31 |
| | | Styrene | 35 | 46 | 38 | — | 35 | 35 | — |
| | | Methyl methacrylate | — | — | — | 58 | — | — | — |
| | | Methacrylic acid | — | 44 | 22 | 18 | — | — | 14 |
| | | Acrylic acid | 35 | — | — | — | 35 | 35 | — |
| | | Number average molecular weight | 28000 | 26500 | 27000 | 25000 | 12000 | 28000 | 22000 |
| Formulation of ink | | Magenta pigment | 7 | 7 | 7 | 7 | 7 | 7 | 7 |
| | | Pigment dispersant | 3.5 | 3.5 | 3.5 | 3.5 | 3.5 | 3.5 | 3.5 |
| | Resin particles | Resin particles A | 3 | 3 | 3 | 3 | 3 | — | — |
| | | Resin particles B | — | — | — | — | — | 5 | 5 |
| | Surfactant | OLFINE E1010 | 0.25 | 0.25 | 0.25 | 0.25 | 0.25 | — | — |
| | | BYK-347 | — | — | — | — | — | 0.1 | 0.1 |
| | Organic solvent | Propylene glycol | 26 | 26 | 26 | 26 | 26 | 23 | 23 |
| | | EGmHE | — | — | — | — | — | 3 | 3 |
| | | Water | Remaining amount | Remaining amount | Remaining amount | Remaining amount | Remaining amount | Remaining amount | Remaining amount |

(White Ink W1)

—Preparation of White Pigment Dispersion Liquid WA1—

136.4 parts by mass of the pigment dispersant Q1, 163.6 parts by mass of butyl carbitol, and 450 parts by mass of C.I. Pigment White 6 (trade name, "JR-405", manufactured by Tayca Corporation, titanium oxide) as a white pigment were blended with each other and stirred with a disper. Next, the white pigment was sufficiently dispersed using a horizontal media disperser, thereby obtaining an oil-based pigment dispersion liquid. The average particle diameter of the white pigment dispersed in the oil-based pigment dispersion liquid was 290 nm. The viscosity of the oil-based pigment dispersion liquid was 86.3 mPa·s. Next, a mixed solution consisting of 4.0 parts by mass of potassium hydroxide and 341 parts by mass of water was gradually added to 700 parts by mass of the oil-based pigment dispersion liquid while being stirred using a disper, and the solution was neutralized for phase conversion. Thereafter, the white pigment was sufficiently dispersed using a horizontal media disperser, thereby obtaining an aqueous pigment dispersion liquid. Coarse particles were removed from the obtained aqueous pigment dispersion liquid using a 10 μm filter and a 5 μm filter. At this time, clogging of the filter was not found. The average particle diameter of the white pigment dispersed in the aqueous pigment dispersion liquid was 266 nm. The viscosity of the aqueous pigment dispersion liquid was 14.5 mPa·s, and the pH thereof was 9.8. The average particle diameter of the white pigment was measured by light scattering using a particle size distribution measuring device (product name "UPA-EX150", manufactured by Nikkiso Co., Ltd.).

—Preparation of White Ink W1—

Surfactant: OLFINE E1010 (manufactured by Nis sin Chemical Co., Ltd.): 0.25% by mass Water: remaining amount such that total amount of composition of ink reached 100% by mass (White Inks W2 to W11)

White inks W2 to W11 were prepared by the same method as the method for the white ink W1, using the resin particles, the surfactant, and the organic solvent listed in Table 2 after the pigment dispersant was changed to the pigment dispersant listed in Table 2 and a white pigment dispersion liquid was prepared by the same method as the method for the white pigment dispersion liquid WA1.

The contents (% by mass) of the pigment, the pigment dispersant, the resin particles, the organic solvent, and the surfactant with respect to the total amount of the white ink are listed in Table 2. Further, the type, the form, the type of the monomer constituting the polymer, the content thereof (% by mass), and the glass transition temperatures Tg1 and Tg2 of the pigment dispersant contained in each white ink are listed in Table 2 (Tg1<Tg2). In the columns of the forms, "block" denotes a block polymer and "random" denotes a random polymer. In regard to the glass transition temperatures Tg1 and Tg2, only an example in which the pigment dispersant contained in the white ink was a block polymer is described. Each of the contents of water is the remaining amount set such that the total amount of the ink reaches 100% by mass, and is listed as "remaining amount" in Table 2.

TABLE 2

| | | | W1 | W2 | W3 | W4 | W5 | W6 |
|---|---|---|---|---|---|---|---|---|
| Pigment dispersant | | Type | Q1 | Q2 | Q3 | Q4 | Q5 | Q6 |
| | | Form | Block | Block | Block | Block | Block | Block |
| | | Tg1 (° C.) | 92 | 137.9 | 108.5 | 0 | 113.7 | 21.3 |
| | | Tg2 (° C.) | 154 | 154 | 163.3 | 203.1 | 170.3 | 79.7 |
| | Composition of pigment dispersant | Lauryl methacrylate | — | — | — | — | — | 30 |
| | | Isobornyl methacrylate | 55 | 58 | 27 | 24 | 10 | — |
| | | Cyclohexyl methacrylate | 31 | 27 | 49 | 11 | — | — |
| | | Styrene | — | — | — | — | — | — |
| | | Benzyl methacrylate | — | — | — | — | — | — |
| | | Methyl methacrylate | — | — | — | — | 56 | 13 |
| | | Methacrylic acid | 14 | 15 | 24 | 65 | 21 | 17 |
| | | Acrylic acid | — | — | — | — | 13 | 40 |
| | Number average molecular weight | | 11000 | 9500 | 10000 | 12000 | 9800 | 11500 |
| Formulation of ink | White pigment | | 12 | 12 | 12 | 12 | 12 | 12 |
| | Pigment dispersant | | 0.6 | 0.6 | 0.6 | 0.6 | 0.6 | 0.6 |
| | Resin particles | Resin particles A | 6 | 6 | 6 | 6 | 6 | 6 |
| | | Resin particles B | — | — | — | — | — | — |
| | Surfactant | OLFINE E1010 | 0.25 | 0.25 | 0.25 | 0.25 | 0.25 | 0.25 |
| | | BYK-347 | — | — | — | — | — | — |
| | Organic solvent | Propylene glycol | 25 | 25 | 25 | 25 | 25 | 25 |
| | | EGmHE | — | — | — | — | — | — |
| | Water | | Remaining amount | Remaining amount | Remaining amount | Remaining amount | Remaining amount | Remaining amount |

| | | | W7 | W8 | W9 | W10 | W11 |
|---|---|---|---|---|---|---|---|
| Pigment dispersant | | Type | Q7 | Q1 | Q8 | Q9 | P5 |
| | | Form | Block | Block | Block | Block | Random |
| | | Tg1 (° C.) | 92 | 92 | 54 | 54 | — |
| | | Tg2 (° C.) | 154 | 154 | 94 | 141.7 | — |
| | Composition of pigment dispersant | Lauryl methacrylate | — | — | — | — | 30 |
| | | Isobornyl methacrylate | 55 | 55 | — | 25 | — |
| | | Cyclohexyl methacrylate | 31 | 31 | 27 | — | — |
| | | Styrene | — | — | — | — | 35 |
| | | Benzyl methacrylate | — | — | 14 | 15 | — |
| | | Methyl methacrylate | — | — | 48 | 48 | — |
| | | Methacrylic acid | 14 | 14 | — | — | — |
| | | Acrylic acid | — | — | 11 | 12 | 35 |
| | Number average molecular weight | | 22000 | 11000 | 5800 | 6200 | 12000 |
| Formulation of ink | White pigment | | 12 | 12 | 12 | 12 | 12 |
| | Pigment dispersant | | 0.6 | 0.6 | 0.6 | 0.6 | 0.6 |
| | Resin particles | Resin particles A | 6 | — | 6 | 6 | 6 |
| | | Resin particles B | — | 6 | — | — | — |
| | Surfactant | OLFINE E1010 | 0.25 | — | 0.25 | 0.25 | 0.25 |
| | | BYK-347 | — | 0.2 | — | — | — |
| | Organic solvent | Propylene glycol | 25 | 24 | 25 | 25 | 25 |
| | | EGmHE | — | 3 | — | — | — |
| | Water | | Remaining amount | Remaining amount | Remaining amount | Remaining amount | Remaining amount |

(Pretreatment Liquid)

The resin particles, the aggregating agent, the organic solvent, the surfactant, and water were mixed such that the contents (% by mass) thereof were set as described below, thereby preparing a pretreatment liquid for application to the base material in advance. Details of the resin particles, the aggregating agent, the organic solvent, and the surfactant used for preparing the pretreatment liquid are as follows.

Resin particles: polyester resin (product name, "PES-RESIN A124GP", manufactured by Takamatsu Oil & Fat Co., Ltd.): 10% by mass Aggregating agent: malonic acid: 5% by mass Organic solvent: propylene glycol: 10% by mass Surfactant: sodium dodecyl benzene sulfonate (hard type), (manufactured by Tokyo Chemical Industry Co., Ltd.): 1% by mass Water: remaining amount set such that total amount of pretreatment liquid reached 100% by mass

[Image Recording]

Image recording was performed by the following method using the colored ink, the white ink, and the pretreatment liquid. A GELJET (registered trademark) GX5000 printer head (manufactured by Ricoh Co., Ltd.) was prepared as an ink jet head. The ink jet head is a line head in which 96 nozzles are arranged. The ink jet head was disposed by being fixed to an ink jet recording device. The disposition here was made such that the direction in which 96 nozzles were arranged was inclined by 75.7° with respect to a direction orthogonal to a movement direction of a stage of an ink jet recording device on the same plane. A polyethylene terephthalate (PET) base material (FE2001, thickness of 12 μm, manufactured by Futamura Chemical Co., Ltd.) was prepared as a base material, and the pretreatment liquid adding step and the image recording step were sequentially performed using the PET base material.

(Pretreatment Liquid Adding Step)

The base material was fixed onto the stage of the ink jet recording device, and the pretreatment liquid was applied onto the base material using a wire bar coater while the stage onto which the base material had been fixed was allowed to move in a linear direction at a constant speed of 500 mm/sec. The application amount of the pretreatment liquid was 1.5 g/m$^2$. The pretreatment liquid was started drying under conditions of 50° C. using a dryer 1.5 seconds after the completion of the application of the pretreatment liquid to a site where the application of the pretreatment liquid had been completed. The drying of the pretreatment liquid was completed 3.5 seconds after the completion of the application of the pretreatment liquid. That is, the drying time was 2 seconds.

(Image Recording Step)

The magenta ink was jetted from the ink jet head onto the surface of the base material to which the pretreatment liquid had been applied while the base material from which the pretreatment liquid had been completely dried was allowed to move at a constant stage speed of 50 mm/sec (colored ink applying step). The white ink was continuously jetted after the magenta ink had been jetted, to record a solid image (white ink applying step), thereby obtaining an image recorded material. The magenta ink was started jetting within 2 seconds from the completion of drying of the pretreatment liquid. The ink was jetted under the conditions of a jetting frequency of 24 kHz and a resolution of 1200 dpi×1200 dpi (dot per inch). The total application amount of the magenta ink and the white ink was 17.9 g/m$^2$. Further, the magenta ink and the white ink were degassed through a degassing filter in advance before being jetted, and the temperature was adjusted to 30° C.

[Evaluation]

The bend resistance, the adhesiveness, and the rub resistance were evaluated using the obtained image recorded materials in each example and each comparative example. The evaluation method is as follows.

—Bend Resistance—

The bend resistance was evaluated by the following method in conformity with JIS K 5600-5-1. A cylindrical mandrel bending tester (manufactured by Allgood) was used as a tester. Mandrels having diameters of 8 mm, 10 mm, 12 mm, 13 mm, 16 mm, 19 mm, 20 mm, 25 mm, and 32 mm were prepared as the mandrel.

First, the base material of the image recorded material was brought into contact with the mandrel, and the image recorded material was bent by 180 degrees with the base material inside. Thereafter, the state of the image in a case where the image recorded material was returned to the original planar shape was visually observed. Specifically, the test was performed in order from the mandrel (32 mm) having the largest diameter. In a case where cracks or wrinkles occurred after the test, the test was terminated at that time point. Meanwhile, in a case where no cracks or wrinkles occurred after the test, the test was performed using a mandrel having the next largest diameter, and the test was continued until a mandrel having a diameter of 8 mm was used. The diameter of the mandrel in a case where cracks or wrinkles occurred was defined as "final diameter". The evaluation standards are as follows. The rank 5 denotes that the bend resistance is most excellent, and it can be said that the bend resistance is satisfactory as the final diameter decreases.

5: No cracks or wrinkles occurred in the test performed using a mandrel having a diameter of 8 mm.
4: The final diameter was 8 mm, 10 mm, or 12 mm.
3: The final diameter was 13 mm or 16 mm.
2: The final diameter was 19 mm or 20 mm.
1: The final diameter was 25 mm or 32 mm.

—Adhesiveness—

Cellophane tape (width of 18 mm) (manufactured by Nichiban Co., Ltd.) was firmly attached to the surface of the image recorded material and then peeled off from the surface while the tip of the cellophane tape was held and an angle of 90 degrees was maintained. The surface of the image after the peeling was visually observed. The adhesiveness was evaluated based on the peeled area of the image with respect to the adhesive surface of the cellophane tape. The evaluation standards are as follows. A level of 3 or higher is a level with no problems in practical use.

5: The peeled area was less than 5%.
4: The peeled area was 5% or greater and less than 10%.
3: The peeled area was 10% or greater and less than 20%.
2: The peeled area was 20% or greater and less than 30%.
1: The peeled area was 30% or greater.

—Rub Resistance—

The image surface of the image recorded material was rubbed ten times with a cotton cloth while a load of 200 g was applied thereto, and the image surface and the state of the cotton cloth were visually observed. The evaluation standards are as follows.

4: The rubbed image surface did not change, and color transfer to the cotton cloth was not found.
3: The rubbed image surface did not change, and color transfer to the cotton cloth was almost not found.
2: Scratches were found on the rubbed image surface, and color transfer to the cotton cloth was found.
1: Sites where the base material was exposed were present on the rubbed image surface.

The evaluation results are listed in Tables 3 and 4. In Tables 3 and 4, "|Tgc−Tg1|" and "|Tgc−Tg2|" denote the absolute value of the difference between the glass transition temperature Tgc of the pigment dispersant contained in the magenta ink and the glass transition temperature Tg1 or Tg2 of the pigment dispersant contained in the white ink. Further, in Tables 3 and 4, "|magenta Mn−white Mn|" denotes the absolute value of the difference between the number average molecular weight (Mn) of the pigment dispersant contained in the magenta ink and the number average molecular weight (Mn) of the pigment dispersant contained in the white ink. In Tables 3 and 4, "proportion of structural unit derived from C4 or more hydrocarbon group-containing monomer" denotes the proportion of the structural unit derived from a monomer that contains a hydrocarbon group having 4 or more carbon atoms in the total amount of the polymer. Further, "structural unit derived from C6 or more alicyclic hydrocarbon group-containing monomer" denotes a structural unit derived from a monomer that contains an alicyclic hydrocarbon group having 6 or more carbon atoms.

TABLE 3

| | | Example 1 | Example 2 | Example 3 | Example 4 | Example 5 | Example 6 | Example 7 | Example 8 |
|---|---|---|---|---|---|---|---|---|---|
| Magenta ink | Type of ink | M1 | M2 | M2 | M3 | M4 | M1 | M4 | M1 |
| | Form of dispersant | Random | Random | Random | Random | Random | Random | Random | Random |
| | Tgc | 29.7 | 113.2 | 113.2 | 150.6 | 55.1 | 29.7 | 55.1 | 29.7 |
| | Mn | 28000 | 26500 | 26500 | 27000 | 25000 | 28000 | 25000 | 28000 |
| | Proportion (% by mass) of structural unit derived from C4 or more hydrocarbon group-containing monomer | 65 | 56 | 56 | 78 | 24 | 65 | 24 | 65 |
| White ink | Type of ink | W1 | W2 | W3 | W4 | W1 | W5 | W5 | W6 |
| | Form of dispersant | Block | Block | Block | Block | Block | Block | Block | Block |
| | Tg1 | 92 | 137.9 | 108.5 | 189.5 | 92 | 113.7 | 113.7 | 21.3 |
| | Tg2 | 154 | 154 | 163.3 | 203.1 | 154.0 | 170.3 | 170.3 | 79.7 |
| | Mn | 11000 | 9500 | 10000 | 12000 | 11000 | 9800 | 9800 | 11500 |
| | Proportion (% by mass) of structural unit derived from C4 or more hydrocarbon group-containing monomer | 86 | 85 | 76 | 35 | 86 | 10 | 10 | 0 |
| | Structural unit derived from C6 or more alicyclic hydrocarbon group-containing monomer | Present | Present | Present | Present | Present | Present | Present | Absent |
| Pretreatment liquid | | Present | Present | Present | Present | Present | Present | Present | Present |
| Tgc − Tg1 | | −62.3 | −24.7 | 4.7 | −38.9 | −36.9 | −84 | −58.6 | 8.4 |
| Tgc − Tg2 | | −124.3 | −40.8 | −50.1 | −52.5 | −98.9 | −140.6 | −115.2 | −50 |
| \|Magenta Mn − white Mn\| | | 17000 | 17000 | 16500 | 15000 | 14000 | 18200 | 15200 | 16500 |
| Evaluation | Bend resistance | 5 | 4 | 4 | 4 | 5 | 5 | 5 | 5 |
| | Adhesiveness | 5 | 5 | 5 | 5 | 4 | 4 | 3 | 4 |
| | Rub resistance | 4 | 4 | 4 | 4 | 4 | 4 | 4 | 3 |

TABLE 4

| | | Example 9 | Example 10 | Example 11 | Example 12 | Example 13 | Example 14 | Comparative Example 1 | Comparative Example 2 | Comparative Example 3 |
|---|---|---|---|---|---|---|---|---|---|---|
| Magenta ink | Type of ink | M1 | M5 | M6 | M1 | M1 | M6 | M2 | M7 | M7 |
| | Form of dispersant | Random | Random | Random | Random | Random | Random | Random | Block | Block |
| | Tgc | 29.7 | 29.7 | 29.7 | 29.7 | 29.7 | 29.7 | 113.2 | — | — |
| | Mn | 28000 | 12000 | 28000 | 28000 | 28000 | 28000 | 26500 | 22000 | 22000 |
| | Proportion (% by mass) of structural unit derived from C4 or more hydrocarbon group-containing monomer | 65 | 65 | 65 | 65 | 65 | 65 | 56 | 86 | 86 |
| White ink | Type of ink | W7 | W7 | W8 | W9 | W10 | W8 | W11 | W9 | W11 |
| | Form of dispersant | Block | Block | Block | Block | Block | Block | Random | Block | Random |
| | Tg1 | 92 | 92 | 92 | 54 | 54 | 92 | — | 54 | — |
| | Tg2 | 154 | 154 | 154 | 94 | 141.7 | 154 | — | 94 | — |
| | Mn | 22000 | 22000 | 11000 | 5800 | 6200 | 11000 | 12000 | 5800 | 12000 |
| | Proportion (% by mass) of structural unit derived from C4 or more hydrocarbon group-containing monomer | 86 | 86 | 86 | 41 | 40 | 86 | 65 | 41 | 65 |
| | Structural unit derived from C6 or more alicyclic hydrocarbon group-containing monomer | Present | Present | Present | Present | Present | Present | Present | Present | Present |
| Pretreatment liquid | | Present | Present | Absent | Present | Present | Present | Present | Present | Present |
| Tgc − Tg1 | | −62.3 | −62.3 | −62.3 | −24.3 | −24.3 | −62.3 | — | — | — |

TABLE 4-continued

| | | Example 9 | Example 10 | Example 11 | Example 12 | Example 13 | Example 14 | Comparative Example 1 | Comparative Example 2 | Comparative Example 3 |
|---|---|---|---|---|---|---|---|---|---|---|
| Tgc − Tg2 | | −124.3 | −124.3 | −124.3 | −64.3 | −112.0 | −124.3 | — | — | — |
| \|Magenta Mn − white Mn\| | | 6000 | 10000 | 17000 | 22200 | 21800 | 17000 | 14500 | 16200 | 10000 |
| Evaluation | Bend resistance | 4 | 4 | 4 | 5 | 5 | 5 | 2 | 2 | 5 |
| | Adhesiveness | 5 | 5 | 4 | 5 | 5 | 5 | 5 | 2 | 2 |
| | Rub resistance | 4 | 4 | 3 | 4 | 4 | 4 | 1 | 4 | 2 |

As listed in Tables 3 and 4, in Examples 1 to 14, it was found that since the colored ink containing a magenta pigment, a random polymer, and water and the white ink containing a white pigment, a block polymer, and water were used, the bend resistance and the adhesiveness of the obtained image recorded material were excellent.

On the contrary, in Comparative Example 1, it was found that since the pigment dispersant contained in the white ink was a random polymer, the bend resistance and the rub resistance were degraded.

In Comparative Example 2, it was found that since the pigment dispersant contained in the magenta ink was a block polymer, the bend resistance and the adhesiveness were degraded.

In Comparative Example 3, it was found that since the pigment dispersant contained in the magenta ink was a block polymer and the pigment dispersant contained in the white ink was a random polymer, the adhesiveness and the rub resistance were degraded.

In Example 1, it was found that since the maximum value among the absolute values of the differences between the glass transition temperature Tgc of the pigment dispersant contained in the magenta ink and each of the glass transition temperatures Tg1 and Tg2 of the pigment dispersant contained in the white ink was 50° C. or higher, the bend resistance was excellent as compared with Example 2.

In Example 1, it was found that since the minimum value among the absolute values of the differences between the glass transition temperature Tgc of the pigment dispersant contained in the magenta ink and each of the glass transition temperatures Tg1 and Tg2 of the pigment dispersant contained in the white ink was 5° C. or higher, the bend resistance was excellent as compared with Example 3.

In Example 1, it was found that since the glass transition temperature Tgc of the pigment dispersant contained in the magenta ink was lower than both the glass transition temperatures Tg1 and Tg2 of the pigment dispersant contained in the white ink, the bend resistance was excellent as compared with Example 3.

In Example 1, it was found that since the glass transition temperature Tgc of the pigment dispersant contained in the magenta ink was 150° C. or lower and the highest glass transition temperature Tg2 between the glass transition temperatures of the pigment dispersant contained in the white ink was 200° C. or lower, the bend resistance was excellent as compared with Example 4.

In Example 1, it was found that since both the pigment dispersant contained in the magenta ink and the pigment dispersant contained in the white ink were polymers having 30% by mass or greater of the structural unit derived from a monomer that contained a hydrocarbon group having 4 or more carbon atoms, the adhesiveness was excellent as compared with Examples 5 to 7.

In Example 1, it was found that since the pigment dispersant contained in the white ink was a polymer containing the structural unit derived from a monomer that contained an alicyclic hydrocarbon group having 6 or more carbon atoms, the adhesiveness and the rub resistance were excellent as compared with Example 8.

In Example 1, it was found that since the absolute value of the difference between the number average molecular weight of the pigment dispersant contained in the magenta ink and the number average molecular weight of the pigment dispersant contained in the white ink was 10,000 or greater, the bend resistance was excellent as compared with Example 9.

In Example 1, it was found that since the number average molecular weight of the pigment dispersant contained in the magenta ink was greater than the number average molecular weight of the pigment dispersant contained in the white ink, the bend resistance was excellent as compared with Example 10.

In Example 14, it was found that since the pretreatment liquid was used, the bend resistance, the adhesiveness, and the rub resistance were excellent as compared with Example 11.

What is claimed is:

1. An ink set comprising:

a colored ink which comprises at least one colored pigment selected from the group consisting of a chromatic pigment and a black pigment, a first pigment dispersant, and water; and a white ink which comprises a white pigment, a second pigment dispersant, and water, wherein the first pigment dispersant comprises a random polymer, and the second pigment dispersant comprises a block polymer, wherein each of the first pigment dispersant and the second pigment dispersant comprises a polymer comprising a structural unit derived from a monomer that comprises a hydrocarbon group having 4 or more carbon atoms, in a content of 30% by mass or greater with respect to a total amount of the polymer.

2. The ink set according to claim 1, wherein in a case where a glass transition temperature of the first pigment dispersant is defined as Tgc, and n number of glass transition temperatures of the second pigment dispersant are respectively defined as Tg1 to Tgn, a maximum value among absolute values of differences between Tgc and Tg1 to Tgn is 50° C. or higher.

3. The ink set according to claim 1, wherein in a case where a glass transition temperature of the first pigment dispersant is defined as Tgc, and n number of glass transition temperatures of the second pigment dispersant are respectively defined as Tg1 to Tgn, a minimum value among absolute values of differences between Tgc and Tg1 to Tgn is 5° C. or higher.

4. The ink set according to claim 2, wherein Tgc represents a value less than any of Tg1 to Tgn.

5. The ink set according to claim 3,
wherein Tgc represents a value less than any of Tg1 to Tgn.

6. The ink set according to claim 2,
wherein Tgc is 150° C. or lower, and
a highest temperature among Tg1 to Tgn is 200° C. or lower.

7. The ink set according to claim 3,
wherein Tgc is 150° C. or lower, and
a highest temperature among Tg1 to Tgn is 200° C. or lower.

8. The ink set according to claim 1,
wherein the second pigment dispersant comprises a polymer comprising a structural unit derived from a monomer that comprises an alicyclic hydrocarbon group having 6 or more carbon atoms.

9. The ink set according to claim 1,
wherein an absolute value of a difference in number average molecular weight between the first pigment dispersant and the second pigment dispersant is 10,000 or greater.

10. The ink set according to claim 1,
wherein a number average molecular weight of the first pigment dispersant is greater than a number average molecular weight of the second pigment dispersant.

11. The ink set according to claim 1, further comprising:
a pretreatment liquid comprising an aggregating agent.

12. An image recording method, comprising:
applying the colored ink in the ink set according to claim 1 onto an impermeable base material using an ink jet recording method; and
applying the white ink in the ink set according to claim 1 using an ink jet recording method onto a colored ink film formed by the application of the colored ink.

13. An ink set comprising:
a colored ink which comprises at least one colored pigment selected from the group consisting of a chromatic pigment and a black pigment, a first pigment dispersant, and water; and
a white ink which comprises a white pigment, a second pigment dispersant, and water,
wherein the first pigment dispersant comprises a random polymer, and
the second pigment dispersant comprises a block polymer,
wherein in a case where a glass transition temperature of the first pigment dispersant is defined as Tgc, and
n number of glass transition temperatures of the second pigment dispersant are respectively defined as Tg1 to Tgn,
a maximum value among absolute values of differences between Tgc and Tg1 to Tgn is 50° C. or higher.

14. The ink set according to claim 13, further comprising:
a pretreatment liquid comprising an aggregating agent.

15. An image recording method, comprising:
applying the colored ink in the ink set according to claim 14 onto an impermeable base material using an ink jet recording method; and
applying the white ink in the ink set according to claim 1 using an ink jet recording method onto a colored ink film formed by the application of the colored ink.

16. An ink set comprising:
a colored ink which comprises at least one colored pigment selected from the group consisting of a chromatic pigment and a black pigment, a first pigment dispersant, and water; and
a white ink which comprises a white pigment, a second pigment dispersant, and water,
wherein a pretreatment liquid comprising an aggregating agent,
wherein the first pigment dispersant comprises a random polymer, and
the second pigment dispersant comprises a block polymer.

17. An image recording method, comprising:
applying the colored ink in the ink set according to claim 16 onto an impermeable base material using an ink jet recording method; and
applying the white ink in the ink set according to claim 1 using an ink jet recording method onto a colored ink film formed by the application of the colored ink.

* * * * *